(12) United States Patent
Byun

(10) Patent No.: US 11,288,202 B2
(45) Date of Patent: Mar. 29, 2022

(54) MEMORY CONTROLLER AND METHOD OF OPERATING THE SAME

(71) Applicant: SK hynix Inc., Gyeonggi-do (KR)

(72) Inventor: Eu Joon Byun, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 178 days.

(21) Appl. No.: 16/589,953

(22) Filed: Oct. 1, 2019

(65) Prior Publication Data

US 2020/0264982 A1 Aug. 20, 2020

(30) Foreign Application Priority Data

Feb. 15, 2019 (KR) ........................ 10-2019-0018075

(51) Int. Cl.
*G06F 12/10* (2016.01)

(52) U.S. Cl.
CPC ........ *G06F 12/10* (2013.01); *G06F 2212/657* (2013.01)

(58) Field of Classification Search
None
See application file for complete search history.

(56) References Cited

U.S. PATENT DOCUMENTS

| 11,099,980 B2* | 8/2021 | Hetzler | G06F 3/064 |
| 2012/0117297 A1* | 5/2012 | Ish | G06F 3/0605 711/4 |
| 2014/0010152 A1* | 1/2014 | Park | H04W 28/065 370/328 |
| 2014/0281689 A1* | 9/2014 | Fischer | G06F 11/1092 714/6.22 |
| 2015/0095546 A1* | 4/2015 | Bennett | G06F 12/0246 711/5 |
| 2015/0347296 A1* | 12/2015 | Kotte | G06F 3/0679 711/103 |
| 2016/0048459 A1* | 2/2016 | Oh | G06F 12/0246 711/103 |

(Continued)

FOREIGN PATENT DOCUMENTS

KR 10-0963140 B1 6/2010
KR 10-2014-0057454 A 5/2014

(Continued)

OTHER PUBLICATIONS

Jeong, W et al., Improving Flash Storage Performance by Caching Address Mapping Table in Host Memory, 2017, HotStorage.

*Primary Examiner* — Charles Rones
*Assistant Examiner* — Ryan Dare
(74) *Attorney, Agent, or Firm* — IP & T Group LLP

(57) ABSTRACT

Provided herein may be a memory controller configured to control a memory device. The memory controller may include: a mapping data determination unit configured to receive, from a memory device, bitmap information indicating whether a map segment, corresponding a bit included in the bitmap information and including a plurality of pieces of extended mapping data, has been stored in the memory device and a mapping data management unit configured to output information about generation of the plurality of pieces of extended mapping data based on the bitmap information. Each of the plurality of pieces of extended mapping data may include mapping information between a logical block address and a physical block address.

13 Claims, 15 Drawing Sheets

(56) References Cited

U.S. PATENT DOCUMENTS

| | | | | |
|---|---|---|---|---|
| 2017/0192902 | A1* | 7/2017 | Hwang | G06F 12/0246 |
| 2018/0157427 | A1* | 6/2018 | Hong | G06F 3/0652 |
| 2019/0121570 | A1* | 4/2019 | Kim | G06F 12/0246 |
| 2020/0004671 | A1* | 1/2020 | Neufeld | G06F 3/0644 |
| 2020/0183822 | A1* | 6/2020 | Bates | H04L 43/50 |
| 2020/0202919 | A1* | 6/2020 | Byun | G11C 11/409 |
| 2020/0226072 | A1* | 7/2020 | Kang | G06F 12/121 |

FOREIGN PATENT DOCUMENTS

| | | |
|---|---|---|
| KR | 10-2015-0132151 A | 11/2015 |
| KR | 10-2017-0031389 A | 3/2017 |
| KR | 10-2017-0081126 | 7/2017 |
| KR | 10-1798036 B1 | 11/2017 |
| KR | 10-2018-0016679 A | 2/2018 |

* cited by examiner

FIG. 3A

| MAPPING DATA TYPE | Mapping_DATA | Logical Block Address, LBA | Physical Block Address, PBA |
|---|---|---|---|
| NORMAL MAPPING DATA | Mapping_DATA1 | LBA1 | PBA1 |
| | Mapping_DATA2 | LBA2 | PBA2 |

FIG. 3B

| MAPPING DATA TYPE | Mapping_DATA | Logical Block Address, LBA | Physical Block Address, PBA | ADDITIONAL FIELD INFORMATION |
|---|---|---|---|---|
| EXTENDED MAPPING DATA | Mapping_DATA3 | LBA3 | PBA3 | k3 |
| | Mapping_DATA4 | LBA4 | PBA4 | k4 |

| MAP SEGMENT | BITMAP |
|---|---|
| Map_Segment1 | 0 |
| Map_Segment2 | 0 |

| MAP SEGMENT | STORAGE POSITION |
|---|---|
| Map_Segment1 | 0 |
| Map_Segment2 | 0 |

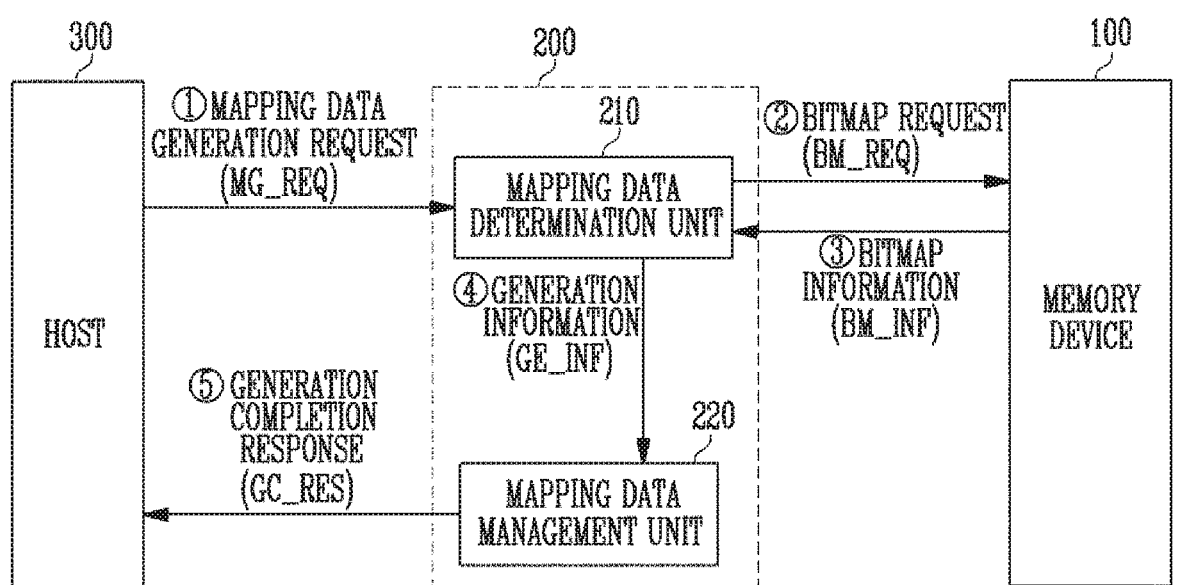

MEMORY CONTROLLER AND METHOD OF OPERATING THE SAME

CROSS-REFERENCE TO RELATED APPLICATION

The present application claims priority under 35 U.S.C. § 119(a) to Korean patent application number 10-2019-0018075, filed on Feb. 15, 2019, which is incorporated herein by reference in its entirety.

BACKGROUND

Field of Invention

Various embodiments of the present disclosure generally relate to an electronic device, and more particularly, to a memory controller and a method of operating the memory controller.

Description of Related Art

Generally, a storage device stores data under control of a host device such as a computer, a smartphone, or a smartpad. According to the type of device provided to store data, examples of the storage device may be classified into a device such as a hard disk drive (HDD) which stores data in a magnetic disk, and a device such as a solid state drive (SSD) or a memory card which stores data in a semiconductor memory, particularly, a nonvolatile memory.

The storage device may include a memory device in which data is stored, and a memory controller configured to store data in the memory device. Memory devices may be classified into volatile memories and nonvolatile memories. Representative examples of the nonvolatile memories may include a read only memory (ROM), a programmable ROM (PROM), an electrically programmable ROM (EPROM), an electrically erasable programmable ROM (EEPROM), a flash memory, a phase-change random access memory (PRAM), a magnetic RAM (MRAM), a resistive RAM (RRAM), and a ferroelectric RAM (FRAM).

SUMMARY

Various embodiments of the present disclosure are directed to a memory controller capable of efficiently generating mapping data, and a method of operating the memory controller.

An embodiment of the present disclosure may provide for a memory controller configured to control a memory device, the memory controller including: a mapping data determination unit configured to receive, from the memory device, bitmap information indicating whether a map segment including a plurality of pieces of extended mapping data has been stored in the memory device, and a mapping data management unit configured to output information about generation of the plurality of pieces of extended mapping data based on the bitmap information, wherein each of the plurality of pieces of extended mapping data may include mapping information between a logical block address and a physical block address, and additional field information.

An embodiment of the present disclosure may provide for a method of operating a memory controller configured to control a memory device, the method including: receiving, from a host, a request for generating extended mapping data, receiving, from a memory device, bitmap information of a map segment corresponding to a plurality of pieces of extended mapping data in response to the request, determining whether to generate a bitmap based on the bitmap information and generating the plurality of pieces of extended mapping data, wherein each of the plurality of pieces of extended mapping data includes mapping information between a logical block address and a physical block address.

An embodiment of the present disclosure may provide for a method of operating a memory controller configured to control a memory device, the method including: receiving, from a host, a request for outputting extended mapping data to the host, receiving, from a memory device, bitmap information of a map segment corresponding to a plurality of pieces of extended mapping data in response to the request and determining whether to output the plurality of pieces of extended mapping data based on the bitmap information, wherein each of the plurality of pieces of extended mapping data includes mapping information between a logical block address and a physical block address.

An embodiment of the present disclosure may provide for a storage comprising: a memory device including a plurality of areas for storing data, and a controller suitable for controlling the memory device, wherein the controller, receives bitmap information from the memory device, the bitmap information including multiple bits, each bit corresponding a plurality of mapping data in a map segment and determines whether each of the plurality of mapping data is generated, based on the bitmap information.

An embodiment of the present disclosure may provide for a storage comprising: a memory device including a plurality of areas for storing data, and a controller suitable for controlling the memory device, wherein the controller, receives bitmap information from the memory device, the bitmap information including multiple bits, each bit corresponding a plurality of mapping data in a map segment and determines whether each of the plurality of mapping data is generated, based on the bitmap information, wherein, when it is determined that the plurality of mapping data is not generated, the controller generates the plurality of mapping data.

BRIEF DESCRIPTION OF THE DRAWINGS

FIGS. 3A and 3B are diagrams illustrating normal mapping data and extended mapping data in accordance with an embodiment of the present disclosure.

FIGS. 6A and 6B are diagrams illustrating an update on a bitmap in accordance with an embodiment of the present disclosure.

FIG. 7 is a diagram illustrating an operation of a memory controller in accordance with an embodiment of the present disclosure.

DETAILED DESCRIPTION

Figure 1:
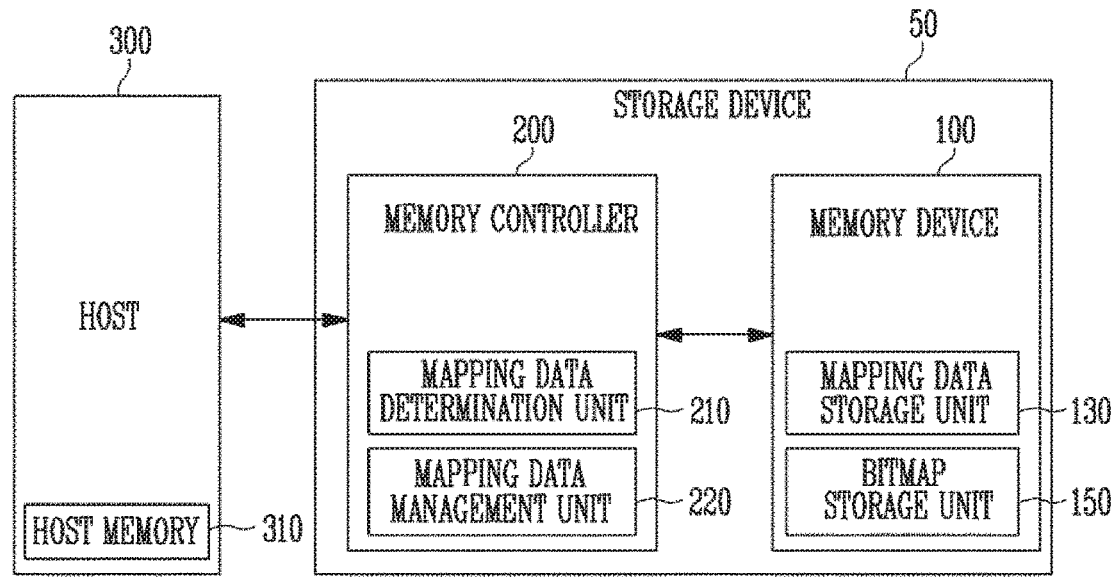
FIG. 1 is a block diagram illustrating a storage device in accordance with an embodiment of the present disclosure.

Specific structural or functional descriptions in the embodiments of the present disclosure introduced in this specification or application are only for description of the embodiments of the present disclosure. The descriptions should not be construed as being limited to the embodiments described in the specification or application.

The present disclosure is described in detail based on embodiments. The present disclosure may, however, be embodied in many different forms and should not be construed as being limited to only the embodiments set forth herein, but should be construed as covering modifications, equivalents or alternatives falling within ideas and technical scopes of the present disclosure. However, it is to be understood that the present description is not intended to limit the present disclosure to those exemplary embodiments, and the present disclosure is intended to cover not only the exemplary embodiments, but also various alternatives, modifications, equivalents and other embodiments that fall within the spirit and scope of the present disclosure.

It will be understood that, although the terms "first", "second", etc. may be used herein to describe various elements, these elements should not be limited by these terms. These terms are only used to distinguish one element, from another element. For instance, a first element discussed below could be termed a second element without departing from the teachings of the present disclosure. Similarly, the second element could also be termed the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that describe the relationship between elements, such as "between", "directly between", "adjacent to" or "directly adjacent to" should be construed in the same way.

The terminology used herein is for the purpose of describing particular embodiments only and is not intended to be limiting. In the present disclosure, the singular forms are intended to include the plural forms as well, unless the context clearly indicates otherwise. It will be further understood that the terms "comprise", "include", "have", etc. when used in this specification, specify the presence of stated features, integers, steps, operations, elements, components, and/or combinations thereof but do not preclude the presence or addition of one or more other features, integers, steps, operations, elements, components, and/or combinations thereof.

Unless otherwise defined, all terms including technical and scientific terms used herein have the same meaning as commonly understood by one of ordinary skill in the art to which the present disclosure belongs. It will be further understood that terms used herein should be interpreted as having a meaning that is consistent with their meaning in the context of this specification and the relevant art, and will not be interpreted in an idealized or overly formal sense unless expressly so defined herein.

Detailed description of functions and structures well known to those skilled in the art will be omitted to avoid obscuring the subject matter of the present disclosure. This aims to omit unnecessary description so as to make the subject matter of the present disclosure clear.

Various embodiments of the present disclosure will now be described more fully hereinafter with reference to the accompanying drawings, in which preferred embodiments of the present disclosure are shown, so that those of ordinary skill in the art can easily carry out the technical idea of the present disclosure.

FIG. 1 is a block diagram illustrating a storage device 50 in accordance with an embodiment of the present disclosure.

Referring to FIG. 1, the storage device 50 may include a memory device 100 and a memory controller 200.

The storage device 50 may be a device configured to store data under control of a host 300 such as a cellular phone, a smartphone, an MP3 player, a laptop computer, a desktop computer, a game machine, a television (TV), a tablet personal computer (PC), or an in-vehicle infotainment system.

The storage device 50 may be manufactured as any one of various types of storage devices depending on a host interface, which is a communication system with the host 300. For example, the data storage device 50 may be configured of any one of various types of storage devices such as an SSD, MMC, eMMC, RS-MMC, or micro-MMC type multimedia card, an SD, mini-SD, micro-SD type secure digital card, a universal serial bus (USB) storage device, a universal flash storage (UFS) device, a personal computer memory card international association (PCMCIA) card type storage device, a peripheral component interconnection (PCI) card type storage device, a PCI-express (PCI-e or PCIe) type storage device, a compact flash (CF) card, a smart media card, and a memory stick.

The storage device 50 may be manufactured in the form of any one of various package types. For instance, the storage device 50 may be manufactured in the form of any one of various package types such as a package on package (POP) type, a system in package (SIP) type, a system on chip (SOC) type, a multi-chip package (MCP) type, a chip on board (COB) type, a wafer-level fabricated package (WFP) type, and a wafer-level stack package (WSP) type.

The memory controller 200 may control overall operations of the storage device 50.

When power is applied to the storage device 50, the memory controller 200 may execute firmware. In the case where the memory device 100 is a flash memory device, the memory controller 200 may execute firmware such as a flash translation layer (FTL) for controlling communication between the host 300 and the memory device 100.

The memory controller 200 may include a mapping data determination unit 210. The mapping data determination unit 210 may receive a mapping data generation request MG_REQ from the host 300. The mapping data generation request MG_REQ may be an extended mapping data request. The extended mapping data request may be a request for generating or reading extended mapping data. The extended mapping data may include mapping information indicating a mapping relationship between a logical block address LBA and a physical block address PBA, and additional field information. The additional field information may include information about the number of times the mapping relationship between the logical block address LBA and the physical block address PBA has been updated and/or information for error correction of the extended mapping data. The extended mapping data may be data including a logical block address LBA of a hot data area. The hot data area may be determined based on a frequency of access of the host 300 to the logical block address LBA. For example, when the frequency of access for a certain logical block address is relatively high (or is greater than a threshold value), an area corresponding to the certain logical block address may be a hot data area. Conversely, when the frequency of access for a certain logical block address is relatively low, an area corresponding to the certain logical block address may be a cold data area.

The mapping data determination unit 210 may receive bitmap information BM_INF of a map segment corresponding to a plurality of pieces of extended mapping data, based on an internal operation of the memory controller 200 or a data generation request MG_REQ received from the host 300. In various embodiments, the mapping data determination unit 210 may receive bitmap information BM_INF of a map segment to which extended mapping data corresponding to an internal operation of the memory controller 200 or a data generation request MG_REQ received from the host 300, belongs. Each map segment may include a plurality of pieces of extended mapping data. The bitmap information BM_INF may include information about a map segment. That is, the bitmap information BM_INF may include information about a plurality of pieces of extended mapping data corresponding to a map segment. In various embodiments, the bitmap information BM_INF may include information about whether generation of a plurality of pieces of extended mapping data has been completed, and a position at which the extended mapping data are stored. The mapping data determination unit 210 may output the bitmap information BM_INF to a mapping data management unit 220.

The mapping data management unit 220 may determine whether to generate or output a plurality of pieces of extended mapping data, based on the bitmap information BM_INF. Furthermore, the mapping data management unit 220 may output a response corresponding to a mapping data generation request MG_REQ, based on the bitmap information BM_INF.

In various embodiments, if a request received from the host 300 is a request for generating a plurality of pieces of extended mapping data, the mapping data management unit 220 may generate and output the plurality of pieces of extended mapping data. Alternatively, if the request received from the host 300 is a request for reading a plurality of pieces of extended mapping data, the mapping data management unit 220 may read the plurality of pieces of extended mapping data from the memory device 100 and output them to the host 300.

The memory device 100 may store data therein. The memory device 100 may operate under control of the memory controller 200. The memory device 100 may include a memory cell array including a plurality of memory cells configured to store data therein. The memory cell array may include a plurality of memory blocks. Each memory block may include a plurality of memory cells. Each memory block may include a plurality of pages. In an embodiment, each page may be the unit of storing data in the memory device 100 or reading stored data from the memory device 100. Each memory block may be the unit of erasing data.

In an embodiment, the memory device 100 may be a double data rate synchronous dynamic random access memory (DDR SDRAM), a low power double data rate4 (LPDDR4) SDRAM, a graphics double data rate (GDDR) SDRAM, a low power DDR (LPDDR), a Rambus dynamic random access memory (RDRAM), a NAND flash memory, a vertical NAND flash memory, a NOR flash memory device, a resistive random access memory (RRAM), a phase-change memory (PRAM), a magnetoresistive random access memory (MRAM), a ferroelectric random access memory (FRAM), or a spin transfer torque random access memory (STT-RAM). In this specification, the memory device 100 is a NAND flash memory.

In an embodiment, the memory device 100 may be embodied in a three-dimensional array structure. The present disclosure may be applied not only to a flash memory 100 in which a charge storage layer is formed of a conductive floating gate (FG), but also to a charge trap flash (CTF) memory in which a charge storage layer is formed of an insulating layer.

In an embodiment, each of the memory cells in the memory device 100 may be formed of a single-level cell (SLC) capable of storing one bit of data. Alternatively, each of the memory cells included in the memory device 100 may be formed of a multi-level cell (MLC) capable of storing two bits of data, a triple-level cell (TLC) capable of storing three data bits, or a quad-level cell (QLC) capable of storing four bits of data.

The memory device 100 may receive a command and an address from the memory controller 200 and access an area of the memory cell array that is selected by the address. In other words, the memory device 100 may perform an operation corresponding to the command on the region selected by the address. For example, the memory device 100 may perform a write (or program) operation, a read operation, and an erase operation. During a program operation, the memory device 100 may program data to an area selected by an address. During a read operation, the memory device 100 may read data from an area selected by an address. During an erase operation, the memory device 100 may erase data from an area selected by an address.

The memory device 100 may perform a program operation or an erase operation using a set operating voltage under control of the memory controller 200.

The memory device 100 may include a mapping data storage unit 130. The mapping data storage unit 130 may receive extended mapping data generated by the mapping data management unit 220. The extended mapping data may be mapping data generated in response to an internal operation of the memory controller 200 or a mapping data generation request of the host 300. The mapping data storage unit 130 may receive extended mapping data corresponding to a map segment from the mapping data management unit 220. The number of pieces of extended mapping data corresponding to the map segment may vary. In other words, if the mapping data management unit 220 generates all of the plurality of pieces of extended mapping data in a map segment, the extended mapping data in the map segment may be stored in the mapping data storage unit 130.

In various embodiments, if the mapping data management unit 220 generates all of a plurality of pieces of extended mapping data corresponding to a mapping segment, the mapping data storage unit 130 may receive the plurality of pieces of extended mapping data corresponding to the map segment from the mapping data management unit 220. The mapping data storage unit 130 may store the received extended mapping data.

The mapping data storage unit 130 may output the plurality of pieces of extended mapping data in the mapping data storage unit 130, in response to a request of the memory controller 200. The plurality of pieces of extended mapping data may be data corresponding to the map segment. In an embodiment, if all of a plurality of pieces of extended mapping data in one map segment are output, a plurality of pieces of extended mapping data in a subsequent map segment may be output.

The memory device 100 may include a bitmap storage unit 150. The bitmap storage unit 150 may store a bitmap. The bitmap may be set for each map segment. That is, a bitmap may be present for each map segment including a plurality of pieces of extended mapping data. The bitmap storage unit 150 may include decision bits corresponding to a plurality of respective map segments. During an initial operation of the memory device 100, decision bits may be stored in the bitmap storage unit 150. The decision bits may set to a default value. Thereafter, if mapping data in a map segment is allocated, the corresponding decision bit may be updated after the mapping data corresponding to the associated map segment has been generated.

The bitmap may include information about a decision bit and a storage position. The decision bit may be a bit indicating whether all of a plurality of pieces of extended mapping data corresponding to a map segment have been generated. The storage position may indicate a position at which the plurality of pieces of extended mapping data corresponding to the map segment have been stored.

If the bitmap corresponding to the map segment has not been stored in the bitmap storage unit 150, the bitmap storage unit 150 may generate a bitmap in response to a request of the memory controller 200. A bitmap generated at an initial stage may be set to a default value for each map segment. The default value may be set to a logic low level "0" or a logic high level "1". Therefore, in the case where the memory controller 200 has generated all of a plurality of pieces of extended mapping data in a map segment corresponding to a request of the host 300, the bitmap may be updated. In various embodiments, the decision bit may be changed from the default value to a specific value. In addition, the storage position may be changed to indicate an address for a memory block in which the plurality of pieces of extended mapping data have been stored and a corresponding page in the memory block.

In an embodiment, the memory controller 200 may receive data and a logical block address LBA from the host 300, and translate the logical block address LBA into a physical block address PBA indicating addresses of memory cells in which data is to be stored, the memory cells being included in the memory device 100. In addition, the memory controller 200 may store, in a buffer memory (not shown), mapping information indicating a mapping relationship between the logical block address LBA and the physical block address PBA. In an embodiment, the buffer memory may be implemented within the memory controller 200.

The memory controller 200 may control the memory device 100 to perform a program operation, a read operation, or an erase operation in response to a request from the host 300. During a program operation, the memory controller 200 may provide a program command, a physical block address PBA, and data to the memory device 100. During a read operation, the memory controller 200 may provide a read command and a physical block address PBA to the memory device 100. During an erase operation, the memory controller 200 may provide an erase command and a physical block address PBA to the memory device 100.

In an embodiment, the memory controller 200 may autonomously generate a program command, an address and data without a request from the host 300, and transmit them to the memory device 100. For example, the memory controller 200 may provide a command, an address and data to the memory device 100 to perform background operations such as a program operation for wear leveling, and a program operation for garbage collection.

In an embodiment, the memory controller 200 may control at least two or more memory devices 100. In this case, the memory controller 200 may control the memory devices 100 in an interleaving manner so as to enhance the operating performance.

The host 300 may communicate with the storage device 50 using at least one of various communication methods such as universal serial bus (USB), serial AT attachment (SATA), serial attached SCSI (SAS), high speed interchip (HSIC), small computer system interface (SCSI), peripheral component interconnection (PCI), PCI express (PCIe), non-volatile memory express (NVMe), universal flash storage (UFS), secure digital (SD), multimedia card (MMC), embedded MMC (eMMC), dual in-line memory module (DIMM), registered DIMM (RDIMM), and load reduced DIMM (LRDIMM) communication methods.

The host 300 may include a host memory 310. The host memory 310 may store a plurality of pieces of extended mapping data received from the mapping data management unit 220. The plurality of pieces of extended mapping data may be data, which has been stored in the memory device 100 and read from the memory device 100 through the memory controller 200 in response to a request of the host 300. In various embodiments, after a plurality of pieces of extended mapping data are stored in the memory device 100 based on an internal operation of the memory controller 200 or a mapping data generation request MG_REQ of the host 300, the plurality of pieces of extended mapping data in the memory device 100 may be stored in the host memory 310 based on a mapping data read request MR_REQ of the host 300.

The plurality of pieces of extended mapping data to be stored in the host memory 310 may be stored on a map segment basis. A map segment may correspond to a plurality of pieces of extended mapping data. Namely, each map segment may include a plurality of pieces of extended mapping data. In an embodiment, if a plurality of pieces of extended mapping data corresponding to one map segment are stored in the host memory 310, a plurality of pieces of extended mapping data corresponding to a subsequent map segment may be stored in the host memory 310.

Figure 2:
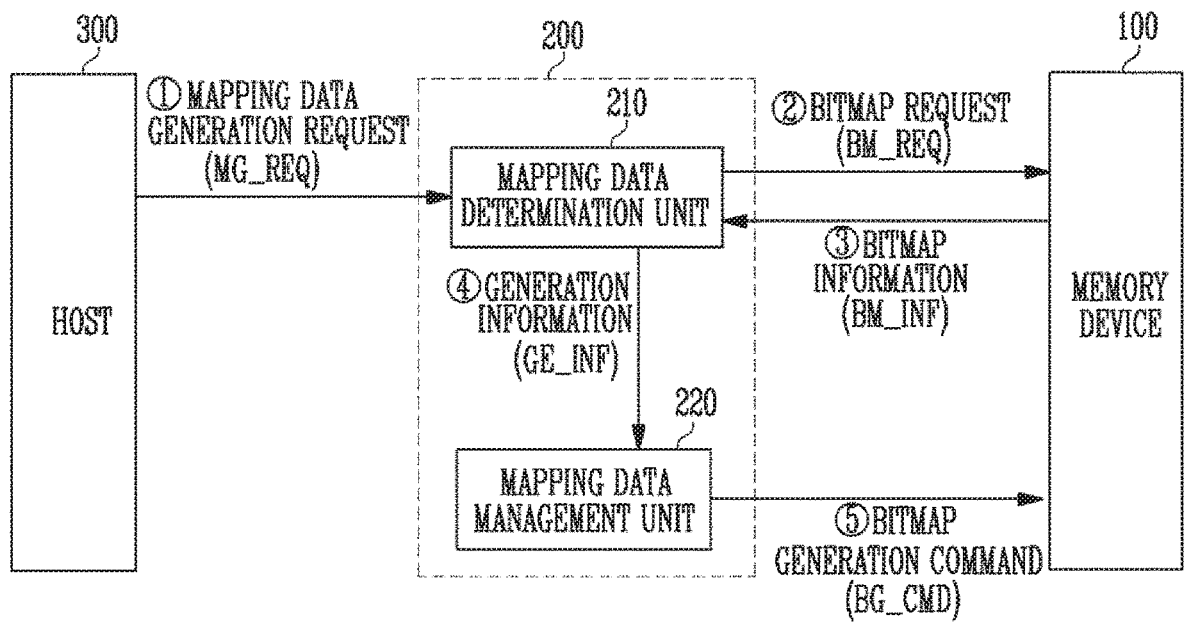
FIG. 2 is a diagram illustrating a memory controller of FIG. 1.

FIG. 2 is a diagram illustrating a memory controller in accordance with an embodiment of the present disclosure, for example, the memory controller 200 of FIG. 1.

Referring to FIG. 2, the memory controller 200 may include a mapping data determination unit 210 and a mapping data management unit 220.

The mapping data determination unit 210 may receive a mapping data generation request MG_REQ from the host 300 (①). The mapping data generation request MG_REQ may be an extended mapping data request. The extended mapping data request may be a request for generating or reading extended mapping data. The mapping data generation request MG_REQ may be a request for generating a single piece or a plurality of pieces of extended mapping data. The extended mapping data may include mapping information indicating a mapping relationship between a logical block address LBA and a physical block address PBA, and additional field information. The additional field information may include information about the number of times the extended mapping data has been updated and/or information for error correction of the extended mapping data. The information for error correction may include an error correction bit. The error correction bit may be a parity bit. The parity bit may be a bit added to check whether an error has occurred during an information transmitting process.

The mapping data determination unit 210 may output a bitmap request BM_REQ to the memory device 100 based on the mapping data generation request MG_REQ received from the host 300 (②). The mapping data determination unit 210 may receive bitmap information BM_INF corresponding to the bitmap request BM_REQ (③) and determine whether to generate extended mapping data based on the bitmap information BM_INF.

In various embodiments, to receive the bitmap information BM_INF for determining whether to generate the extended mapping data based on an internal operation of the memory controller 200 or the mapping data generation request MG_REQ, the mapping data determination unit 210 may output the bitmap request BM_REQ to the memory device 100. The bitmap information BM_INF may include a decision bit and a storage position. The decision bit may indicate whether a plurality of pieces of extended mapping data corresponding to a map segment have been generated. The storage position may indicate an address where the plurality of extended mapping data corresponding to the request of the host 300 are stored in the memory device 100. The bitmap information BM_INF may be stored in the memory device 100 on a map segment basis. A map segment may be the unit corresponding to a plurality of pieces of extended mapping data. Each map segment may include a plurality of pieces of extended mapping data. The number of pieces of extended mapping data in each map segment may vary.

The memory device 100 may output bitmap information BM_INF corresponding to a map segment (④). The map segment may include a plurality of pieces of extended mapping data. In an embodiment, the map segment may include extended mapping data corresponding to a request received from the host 300. In an embodiment, the map segment may include extended mapping data corresponding to an internal operation of the memory controller 200.

The bitmap information BM_INF may include information about a bitmap stored in the bitmap storage unit 150. The bitmap may include a decision bit corresponding to each of a plurality of map segments. The decision bit may indicate whether all of the plurality of pieces of extended mapping data in the corresponding map segment have been generated. In an embodiment, the decision bit may be a logic low level "0" or a logic high level "".

In various embodiments, in the case where all of the plurality of pieces of extended mapping data in the map segment have not been stored in the memory device 100, the decision bit may be "0". Alternatively, in the case where all of the plurality of pieces of extended mapping data in the map segment have been stored in the memory device 100, the decision bit may be "1".

In the case where the decision bit is "0", the decision bit may be updated from "0" to "1". In an embodiment, if a default value of the decision bit is "1", the decision bit may be updated from "1" to "0" after all of the plurality of pieces of extended mapping data included in the map segment have been generated.

In this drawing, the bitmap information BM_INF received from the memory device 100 indicates that all of the plurality of pieces of extended mapping data in the map segment have not been stored. The extended mapping data may be mapping data corresponding to a request received from the host 300. Alternatively, the extended mapping data may be mapping data generated without a request of the host 300.

The mapping data determination unit 210 may output generation information GE_INF based on the bitmap information BM_INF received from the memory device 100 (④). The generation information GE_INF may include information for generating the bitmap information BM_INF and the extended mapping data.

In various embodiments, in the case where the bitmap information BM_INF indicates that all of the plurality of pieces of extended mapping data corresponding to the map segment have not been generated, the mapping data determination unit 210 may output generation information GE_INF for generating a bitmap. Also, in the case where the bitmap information BM_INF indicates that all of the plurality of pieces of extended mapping data corresponding to the map segment have not been generated, the generation information GE_INF may include information for generating a plurality of pieces of extended mapping data. In contrast, in the case where the bitmap information BM_INF indicates that all of the plurality of pieces of extended mapping data corresponding to the map segment have been generated, the generation information GE_INF may include information indicating that the plurality of pieces of extended mapping data have been already generated.

The mapping data management unit 220 may receive the generation information GE_INF from the mapping data determination unit 210 (④). The mapping data management unit 220 may generate a bitmap and/or extended mapping data based on the generation information GE_INF.

In an embodiment, in the case where the bitmap information BM_INF has not been received from the memory device 100, the mapping data management unit 220 may output a bitmap generation command BG_CMD for generating a bitmap to the memory device 100 (⑤). The memory device 100 may generate a bitmap corresponding to the bitmap generation command BG_CMD. In various embodiments, the memory device 100 may generate a bitmap including a decision bit and a storage position. When the bitmap is generated, the decision bit and the storage position each may have a default value. The default value may be "0" or "1".

The mapping data management unit 220 may generate extended mapping data after the bitmap has been generated. In various embodiments, the mapping data management unit 220 may generate the extended mapping data on a map segment basis. The map segment may include a plurality of pieces of extended mapping data. If the plurality of pieces of extended mapping data in the map segment are generated, the mapping data management unit 220 may output the generated extended mapping data to the memory device 100.

FIGS. 3A and 3B are diagrams illustrating normal mapping data and extended mapping data which are generated in response to a request of a host (e.g., the host 300 of FIGS. 1 and 2) in accordance with an embodiment of the present disclosure.

Referring to FIG. 3, mapping data may be generated by the memory controller 200 in response to a request of the host 300. The type of the mapping data may be any one of normal mapping data and extended mapping data. FIG. 3A illustrates an example of the normal mapping data, and FIG. 3B illustrates an example of the extended mapping data.

Referring to FIG. 3A, the normal mapping data may be generated in response to a mapping data generation request MG_REQ of the host 300. The normal mapping data may include mapping information indicating a mapping relationship between a logical block address LBA and a physical block address PBA. The normal mapping data may not include additional field information.

First and second mapping data Mapping_DATA1 and Mapping_DATA2 may be normal mapping data. In other words, the mapping data management unit 220 of FIG. 2 may generate the first and second mapping data Mapping_DATA1 and Mapping_DATA2, based on the mapping data generation request MG_REQ received from the host 300. In an embodiment, the number of pieces of normal mapping data generated by the mapping data management unit 220 may be increased.

Each of the first and second mapping data Mapping_DATA1 and Mapping_DATA2 may include mapping information indicating a mapping relationship between a logical block address LBA and a physical block address PBA. In an embodiment, the first mapping data Mapping_DATA1 may include mapping information indicating a mapping relationship between a first logical block address LBA1 and a first physical block address PBA1. The second mapping data Mapping_DATA2 may include mapping information indicating a mapping relationship between a second logical block address LBA2 and a second physical block address PBA2.

Referring to FIG. 3B, extended mapping data may be generated in response to an internal operation of the memory controller 200 or a mapping data generation request MG_REQ of the host 300. The mapping data generation request MG_REQ may be received from the host 300 based on hot data information about hot data area. The hot data area may be determined based on a frequency of access of the host 300 to the logical block address LBA. For example, when the frequency of access for a certain logical block address is relatively high (or is greater than a threshold value), an area corresponding to the certain logical block address may be a hot data area. Conversely, when the frequency of access for a certain logical block address is relatively low, an area corresponding to the certain logical block address may be a cold data area. The mapping data generation request MG_REQ may be a request for generating the extended mapping data.

The mapping data management unit 220 may generate the extended mapping data based on the mapping data generation request MG_REQ. The extended mapping data may include mapping information indicating a mapping relationship between a logical block address LBA and a physical block address PBA, and additional field information. The normal mapping data may include mapping information indicating a mapping relationship between a logical block address LBA and a physical block address PBA. In other words, the extended mapping data may be data including the normal mapping data and the additional field information.

The extended mapping data may be output to the host 300. The host 300 may store the extended mapping data in the host memory 310. Thereafter, the host 300 may output an operation request and extended mapping data corresponding to the operation request to the memory controller 200. The memory controller 200 may control an operation to be performed in the memory device 100, based on the operation request and the extended mapping data corresponding to the operation request.

In an embodiment, third and fourth mapping data Mapping_DATA3 and Mapping_DATA4 may be extended mapping data. That is, the mapping data management unit 220 may generate the third and fourth mapping data Mapping_DATA3 and Mapping_DATA4, based on the mapping data generation request MG_REQ received from the host 300. In an embodiment, the number of pieces of extended mapping data generated by the mapping data management unit 220 may be increased.

Each of the third and fourth mapping data Mapping_DATA3 and Mapping_DATA3 may include mapping information indicating the mapping relationship between the logical block address LBA and the physical block address PBA, and additional field information k3, k4. In an embodiment, each of the third and fourth mapping data Mapping_DATA3 and Mapping_DATA4 may include normal mapping data and additional field information.

The third mapping data Mapping_DATA3 may include mapping information indicating a mapping relationship between a third logical block address LBA3 and a third physical block address PBA3, and additional field information k3. The fourth mapping data Mapping_DATA4 may include mapping information indicating a mapping relationship between a fourth logical block address LBA4 and a fourth physical block address PBA4, and additional field information k4. The additional field information k3 and k4 in the third and fourth mapping data Mapping_DATA3 and Mapping_DATA4 each may store the number of update times of the mapping information between the logical block address and the physical block address, or data for error correction (ex. Bose-Chaudhuri-Hocquenghem code (BCH code), Low Density Parity-Check Code (LDPC Code), etc.). The data for the error correction may include an error correction bit. The error correction bit may be a parity bit. The parity bit may be a bit added to check whether an error has occurred during an information transmitting process.

In an embodiment, in the case where the number of times the extended mapping data has been updated is stored in the additional field information, the mapping data management unit 220 may determine mapping data to be output to the memory device 100, based on the data in the additional field information. In an embodiment, in the case where the data for correcting an error in the extended mapping data is included in the additional field information, the memory controller 200 may perform an operation of correcting an error that has occurred in the extended mapping data, based on the data in the additional field information.

Figures 4A, 4B, 5:
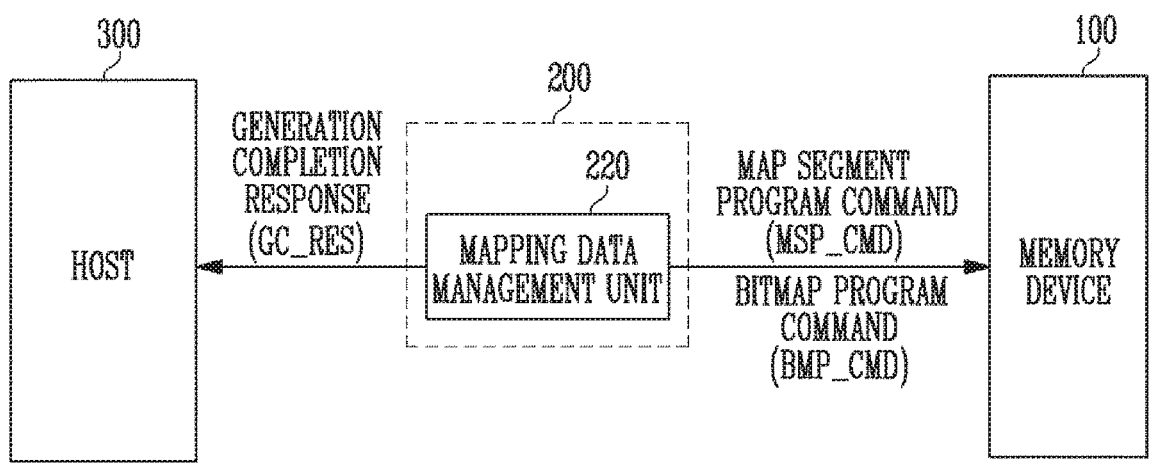
FIGS. 4A and 4B are diagrams illustrating a bitmap to be stored in a memory device in accordance with an embodiment of the present disclosure.
FIG. 5 is a diagram illustrating an operation of a memory controller after generation of mapping data corresponding to a map segment has been completed, in accordance with an embodiment of the present disclosure.

FIGS. 4A and 4B are diagrams illustrating a bitmap to be stored in the memory device 100 of FIG. 2 in accordance with an embodiment of the present disclosure.

FIG. 4A illustrates a bitmap that is initially stored in the memory device 100. FIG. 4B illustrates an initial storage position of the bitmap stored in the memory device 100. The bitmap and the storage position each may correspond to a map segment. The map segment may include a plurality of pieces of extended mapping data. Furthermore, host performance booster (HPB) mapping data may include a plurality of map segments.

In an embodiment, the default value of the decision bit may be included in the bitmap that is initially stored in the memory device 100. The default value of the decision bit may be "0" or "1". In this drawing, the default value of the decision bit is "0".

FIG. 4B illustrates the initial position at which the plurality of extended mapping data in the map segment are stored. Before the plurality of extended mapping data in the map segment are generated, the value of the storage position corresponding to the map segment may be a default value. In FIG. 4B, the default of the storage position is "0".

In an embodiment, in the case where the bitmap information BM_INF has not been received from the memory device 100, the mapping data management unit 220 may output a bitmap generation command BG_CMD for generating a bitmap to the memory device 100. FIG. 4A illustrates an initial bitmap generated by the memory device 100 in response to a bitmap generation command BG_CMD.

In various embodiments, the bitmap may be generated on a map segment basis. FIGS. 4A and 4B illustrate initial generation of bitmaps corresponding to a first map segment Map_Segment1 and a second map segment Map_Segment2. In an embodiment, the memory device 100 may receive a bitmap generation command BG_CMD and generate bitmaps corresponding to a larger number of map segments based on the bitmap generation command BG_CMD.

The map segment may be the unit of including a plurality of pieces of extended mapping data. In various embodiments, each map segment may include at least two or more pieces of extended mapping data. In an embodiment, based on the number of pieces of extended mapping data corresponding to a mapping data generation request received from the host 300, map segments including extended mapping data may be set. In other words, map segments may be set based on the number of pieces of extended mapping data to be generated by the memory controller 200.

In an embodiment, bitmaps respectively corresponding to the first map segment Map_Segment1 and the second map segment Map_Segment2 may be generated. The decision bit may indicate whether extended mapping data corresponding to an internal operation of the memory controller 200 or a mapping data generation request MG_REQ received from the host 300 has been generated.

The decision bit in a bitmap, which is generated based on the bitmap generation command BG_CMD, may be set to a default value at an initial stage. The default value may be "0" or "1". In FIG. 4, the default value is "0".

The decision bit may be updated if all of the plurality of pieces of extended mapping data corresponding to the map segment have been generated. In various embodiments, if all of the plurality of pieces of extended mapping data in the map segment have been generated, the decision bit may be updated from "0" to "1". In an embodiment, if the default value of the decision bit is "1", the decision bit may be updated from "1" to "0" after all of the plurality of pieces of extended mapping data in the map segment have been generated.

In an embodiment, a storage position corresponding to the map segment may be stored in the memory device 100. For example, the storage position may be stored in a nonvolatile memory as the memory device 100. The storage position may indicate an address in which the extended mapping data corresponding to the internal operation of the memory controller 200 or the mapping data generation request MG_REQ received from the host 300 is stored. The address in which the extended mapping data is stored may be an address of a memory block and a page in the memory block.

The storage position may indicate a position at which the plurality of pieces of extended mapping data in the map segment have been stored. The storage position may be updated if all of the plurality of pieces of extended mapping data in the map segment have been generated.

In an embodiment, the storage position, which is generated based on the bitmap generation command BG_CMD, may be set to a default value. The default value may be "0" or "1". In FIG. 4B, the default value is "0". Thereafter, the storage position may be updated if all of the plurality of pieces of extended mapping data corresponding to the map segment have been generated.

In various embodiments, if all of the plurality of pieces of extended mapping data in the map segment have been generated, the storage position may be updated to the address of the memory block in which the extended mapping data has been stored, and the address of the corresponding page in the memory block. The storage position may include information about the position of the memory block in which the extended mapping data has been stored among the plurality of memory blocks in the memory cell array, and the position of the corresponding page in the memory block.

FIG. 5 is a diagram illustrating an operation of the memory controller 200 after generation of mapping data corresponding to a map segment has been completed, in accordance with an embodiment of the present disclosure.

Referring to FIG. 5, the memory controller 200 may include the mapping data management unit 220. In this drawing, the mapping data determination unit 210 in the memory controller 200 is omitted.

For example, FIG. 5 illustrates an operation after a plurality of pieces of extended mapping data corresponding to a mapping data generation request MG_REQ received from the host 300 or an internal operation of the memory controller 200 have been generated. In an embodiment, the mapping data management unit 220 may generate extended mapping data on a map segment basis. If the plurality of pieces of extended mapping data in a map segment are generated, the mapping data management unit 220 may perform an operation of storing the plurality of pieces of extended mapping data in the memory device 100.

In an embodiment, the mapping data management unit 220 may output a map segment program command MSP_CMD to the memory device 100. The map segment program command MSP_CMD may be a command for storing the plurality of pieces of extended mapping data generated by the mapping data management unit 220 in the memory device 100.

In various embodiments, the mapping data management unit 220 may output the map segment program command MSP_CMD to the memory device 100 if generation of the plurality of pieces of extended mapping data is completed. Each time generation of extended mapping data in a map segment is completed, a command for storing the extended mapping data corresponding to the map segment may be output. In an embodiment, if generation of extended mapping data in one map segment is completed, the extended mapping data corresponding to the map segment is stored in the memory device 100. Subsequently, the mapping data management unit 220 may generate extended mapping data corresponding to a subsequent map segment.

In an embodiment, the mapping data management unit 220 may output a bitmap program command BMP_CMD to the memory device 100. The bitmap program command BMP_CMD may be output after all of the plurality of pieces of extended mapping data corresponding to the map segment program command MSP_CMD have been stored in the memory device 100. The bitmap program command BMP_CMD may be output after the map segment program command MSP_CMD has been output. The memory device 100 may receive the bitmap program command BMP_CMD and update the bitmap.

In various embodiments, the bitmap may be updated to indicate that all of the plurality of pieces of extended mapping data corresponding to the map segment have been stored. If the memory device 100 receives the bitmap program command BMP_CMD, the bitmap corresponding to the map segment stored in the memory device 100 may be updated. In an embodiment, a decision bit in the bitmap may be updated from the default value to a specific value. Furthermore, information about the position at which the plurality of pieces of extended mapping data corresponding to the map segment are stored may be updated.

If the bitmap stored in the memory device 100 is updated, the mapping data management unit 220 may output, to the host 300, a response indicating that the generation of the plurality of pieces of extended mapping data corresponding to the internal operation of the memory controller 200 or the mapping data generation request MG_REQ received from the host 300 has been completed. Each time all of the plurality of pieces of extended mapping data corresponding to one map segment are generated, a corresponding response may be output to the host 300. The response output from the mapping data management unit 220 may be a generation completion response GC_RES. After the generation completion response GC_RES has been received, the host 300 may output a request for reading the plurality of pieces of extended mapping data stored in the memory device 100 to the memory controller 200.

FIGS. 6A and 6B are diagrams illustrating an update on a bitmap in accordance with an embodiment of the present disclosure.

FIG. 6A illustrates a bitmap including a decision bit corresponding to a map segment. FIG. 6B illustrates a storage position corresponding to the map segment stored in the memory device 100. The map segment may include a plurality of pieces of extended mapping data. Furthermore, host performance booster (HPB) mapping data may include a plurality of map segments.

In an embodiment, based on an internal operation of the memory controller 200 or a mapping data generation request MG_REQ received from the host 300, a plurality of pieces of extended mapping data in a map segment may be generated.

In an embodiment, in the case where extended mapping data corresponding to the internal operation of the memory controller 200 or the request received from the host 300 have not been stored in the memory device 100, a map segment for generating the extended mapping data may be set. The number of map segments may be determined depending on the maximum number of pieces of extended mapping data that can be included in each map segment. The number of map segments may be determined depending on the number of pieces of extended mapping data to be generated in response to a request received from the host 300.

The number of pieces of extended mapping data corresponding to the map segment may vary. For example, one map segment comprises four pieces of extended mapping data. Moreover, a bit included in bitmap information corresponds to one map segment. That is, four pieces of extended mapping data correspond to one bit included in bitmap information.

In FIGS. 6A and 6B, the number of pieces of extended mapping data corresponding to each map segment is four. Therefore, if the number of pieces of extended mapping data to be generated in response to the mapping data generation request MG_REQ received from the host 300 is eight, the number of map segments may be set to two.

The mapping data management unit 220 may receive generation information GE_INF from the mapping data determination unit 210 and generate extended mapping data. The generation information GE_INF may include information indicating that extended mapping data corresponding to an internal operation of the memory controller 200 or a mapping data generation request MG_REQ received from the host 300 has not been stored in the memory device 100. Based on the generation information GE_INF, the mapping data management unit 220 may generate extended mapping data corresponding to the internal operation of the memory controller 200 or the mapping data generation request MG_REQ.

In an embodiment, the internal operation of the memory controller 200 or the mapping data generation request MG_REQ received from the host 300 may be a request for sequentially generating a plurality of pieces of mapping data. In various embodiments, the mapping data generation request MG_REQ received form the host 300 may be a request for generating random mapping data. In the case where the request received from the host 300 is a request for generating random mapping data, map segments for generating extended mapping data may be set in the order requested.

The mapping data management unit 220 may generate extended mapping data corresponding to a first map segment Map_Segment1. After a plurality of extended mapping data corresponding to the first map segment Map_Segment1 have been generated, a plurality of pieces of extended mapping data corresponding to a second map segment Map_Segment2 may be generated.

If the mapping data management unit 220 generates all of the plurality of pieces of extended mapping data corresponding to the first map segment Map_Segment1, the bit map may be updated. In various embodiments, if all of the plurality of pieces of extended mapping data corresponding to the first map segment Map_Segment1 are generated, the mapping data management unit 220 may output, to the memory device 100, a map segment program command MSP_CMD for storing the extended mapping data corresponding to the first map segment Map_Segment1 in the memory device 100.

After all of the plurality of pieces of extended mapping data corresponding to the first map segment Map_Segment1 are stored in the memory device 100, the mapping data management unit 220 may output a bitmap program command BMP_CMD to the memory device 100 to update a bitmap corresponding to the first map segment Map_Segment1. The memory device 100 may receive the bitmap program command BMP_CMD and update the bitmap. In an embodiment, a decision bit included in the bitmap, and a storage position may be updated.

The decision bit may be a bit indicating whether all of the plurality of pieces of extended mapping data corresponding to the map segment have been generated. Furthermore, the storage position may indicate a position at which the plurality of pieces of extended mapping data corresponding to the map segment have been stored.

Referring to FIG. 6A, to indicate that all of the plurality of pieces of extended mapping data corresponding to the first map segment Map_Segment1 have been generated, the decision bit may be changed from the default value to a specific value.

For example, since the default value of the decision bit is "0", after all of the plurality of pieces of mapping data corresponding to the first map segment Map_Segment1 have been generated, the decision bit corresponding to the first map segment Map_Segment1 may be updated to "1".

Referring to FIG. 6B, the storage position of the extending mapping data corresponding to the first map segment Map_Segment1 may be updated. The storage position may be updated from "0" that is the default value to an address in which the extended mapping data corresponding to the first map segment Map_Segment1 has been stored. In FIGS. 6A and 6B, the address in which the extended mapping data corresponding to the first map segment Map_Segment1 is a first page Page1 of a zeroth memory block Block0.

After all of the plurality of pieces of extended mapping data corresponding to the first map segment Map_Segment1 have been generated and stored in the memory device 100 and the bitmap has been updated, the mapping data management unit 220 may generate extended mapping data corresponding to the second map segment Map_Segment2.

In FIGS. 6A and 6B, all of a plurality of pieces of extended mapping data corresponding to the second map segment Map_Segment2 have not still been generated. Information about the decision bit in the bitmap and the storage position may be set a default value "0". If all of the plurality of pieces of extended mapping data corresponding to the second map segment Map_Segment2 have been generated, the bitmap corresponding to the second map segment Map_Segment2 may be updated.

In an embodiment, while the mapping data management unit 220 generates extended mapping data in response to an internal operation of the memory controller 200 or a request of the host 300, the storage device 50 may be operated in a power sleep mode. The power sleep mode may mean that the storage device 50 operates in a low-power state. If the storage device 50 operates in the power sleep mode, extended mapping data that is being generated by the mapping data management unit 220 may be deleted. However, each time extended mapping data corresponding to the map segment is generated, the extended mapping data is stored in the memory device 100. Hence, the mapping data management unit 220 may generate extended mapping data other than the extended mapping data that is stored in the memory device 100.

In an embodiment, when the storage device 50 operates in the power sleep mode, mapping data that is being generated by the mapping data management unit 220 and is included in the second map segment Map_Segment2 may be deleted. However, since all of the plurality of pieces of extended mapping data corresponding to the first map segment Map_Segment1 have been generated and stored in the memory device 100, the mapping data management unit 220 may generate only extended mapping data corresponding to the second segment. That is, the mapping data management unit 220 may omit generation of the extended mapping data corresponding to the first map segment Map_Segment1.

Therefore, if the power sleep mode of the storage device 50 ends, the mapping data management unit 220 may receive bitmap information BM_INF about the bitmap stored in the memory device 100, and generate whether to generate extended mapping data based on the decision bit in the bitmap.

Since the decision bit of the bitmap indicates whether all of the plurality of pieces of extended mapping data corresponding to the map segment have been generated, the mapping data management unit 220 may determine whether to generate extended mapping data, based on the decision bit. Consequently, in the case where the generation of the extended mapping data in the map segment has not been completed, the extended mapping data in the corresponding map segment may be generated again.

Therefore, after the mapping data management unit 220 has generated the plurality of pieces of extended mapping data in the second map segment Map_Segment2 again, the bitmap corresponding to the second map segment Map_Segment2 may be updated.

FIG. 7 is a diagram illustrating an operation of the memory controller 200 in the case where mapping data corresponding to a map segment has been already generated, in accordance with an embodiment of the present disclosure.

Referring to FIG. 7, the memory controller 200 may include a mapping data determination unit 210 and a mapping data management unit 220. For example, FIG. 7 illustrates an operation of the memory controller 200 in the case where extended mapping data corresponding to an internal operation of the memory controller 200 or a mapping data generation request MG_REQ of the host 300 has been already stored in the memory device 100.

The mapping data determination unit 210 may receive a mapping data generation request MG_REQ from the host 300 (①). The mapping data generation request MG_REQ may be a request for generating the extended mapping data. The mapping data generation request MG_REQ may be a request for generating a plurality of pieces of extended mapping data. The extended mapping data may include mapping information indicating a mapping relationship between a logical block address LBA and a physical block address PBA, and additional field information. The additional field information may include information about the number of times the mapping relationship between the logical block address LBA and the physical block address PBA has been updated and/or information for error correction of the extended mapping data. The information for error correction may include an error correction bit. The error correction bit may be a parity bit. The parity bit may be a bit added to check whether an error has occurred during an information transmitting process.

The mapping data determination unit 210 may output a bitmap request BM_REQ to the memory device 100 based on the internal operation of the memory controller 200 or the mapping data generation request MG_REQ received from the host 300 (②). The mapping data determination unit 210 may receive bitmap information BM_INF corresponding to the bitmap request BM_REQ (③). The mapping data management unit 210 may receive the bitmap information BM_INF and determine whether to generate extended mapping data based on the bitmap information BM_INF.

In an embodiment, the bitmap information BM_INF may include information about a bitmap corresponding to a map segment. The map segment may correspond to a plurality of pieces of extended mapping data. In other words, the map segment may include a plurality of pieces of extended mapping data. Therefore, the bitmap information BM_INF may include information corresponding to at least one map segment including extended mapping data corresponding to the internal operation of the memory controller 200 or the mapping data generation request MG_REQ received from the host 300.

The bitmap information BM_INF may include information about a decision bit corresponding to the map segment, and a storage position. The decision bit may be a bit indicating whether all of the plurality of pieces of extended mapping data corresponding to the map segment have been generated. The storage position may indicate an address in which the plurality of pieces of extended mapping data corresponding to the map segment have been stored.

In the case where the information about the bitmap corresponding to the map segment is not stored in the memory device 100, the bitmap information BM_INF may indicate that all of the plurality of pieces of extended mapping data corresponding to the map segment have not been generated. In the case where the information about the bitmap corresponding to the map segment has been stored in the memory device 100, the mapping data determination unit 210 may receive the bitmap information BM_INF including the decision bit and the storage position.

In FIG. 7, the extended mapping data corresponding to the internal operation of the memory controller 200 or the mapping data generation request MG_REQ of the host 300 has been already stored in the memory device 100. Hence, in the bitmap information BM_INF to be output to the memory device 100, the bitmap of the at least one map segment corresponding to the extended mapping data may include information indicating that the extended mapping data has been stored in the memory device 100. In various embodiments, the decision bit may have a specific value, and information about the storage position may include information about an address in which the extended mapping data are stored.

The mapping data determination unit 210 may output generation information GE_INF based on the bitmap information BM_INF received from the memory device 100 (④). In an embodiment, the generation information GE_INF may include information indicating that the extended mapping data corresponding to the internal operation of the memory controller 200 or the mapping data generation request MG_REQ received from the host 300 has been already generated. The generation information GE_INF may include information indicating that the mapping data management unit 220 does not generate extended mapping data corresponding to the request of the host 300.

If the mapping data management unit 220 receives the generation information GE_INF from the mapping data determination unit 210, the mapping data management unit 220 may output a generation completion response GC_RES to the host 300 (⑤). In an embodiment, the generation information GE_INF may include information indicating that all of the plurality of pieces of extended mapping data corresponding to the internal operation of the memory controller 200 or the mapping data generation request MG_REQ received from the host 300 have been generated. The mapping data management unit 220 may output, to the host 300, the generation completion response GC_RES indicating that all of the plurality of pieces of extended mapping data corresponding to the request received from the host 300 have been generated.

After the generation completion response GC_RES has been received from the mapping data management unit 220, the host 300 may output, to the memory controller 200, a request for reading the extended mapping data generated in response to the mapping data generation request MG_REQ.

Figure 8:
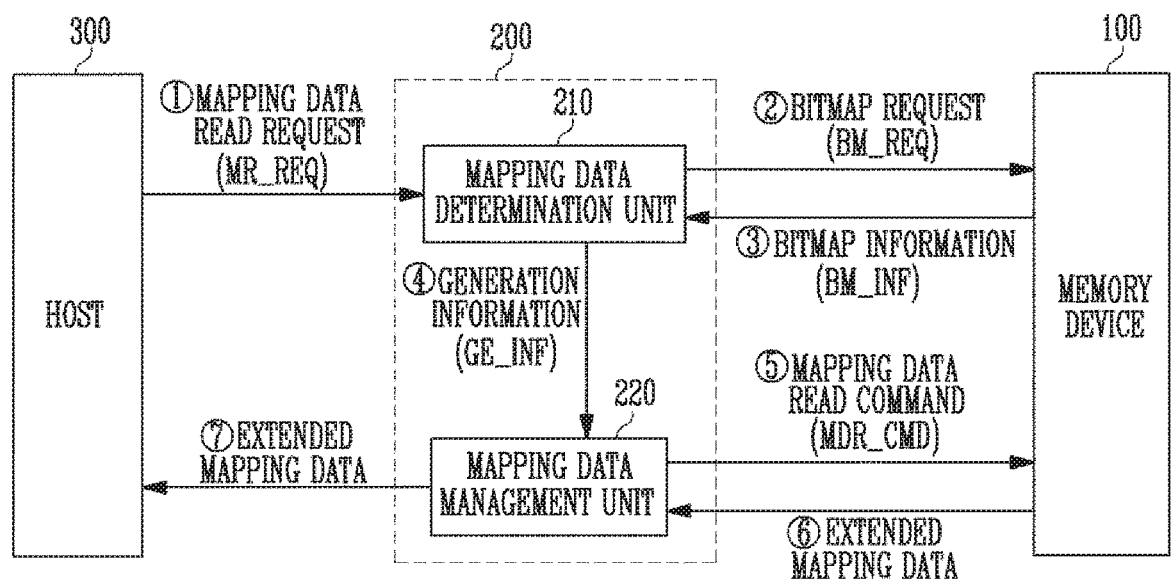
FIG. 8 is a diagram illustrating a method of outputting mapping data corresponding to a request of the host, in accordance with an embodiment of the present disclosure.

FIG. 8 is a diagram illustrating a method of outputting, to the host 300, mapping data corresponding to a request of the host 300, in accordance with an embodiment of the present disclosure.

Referring to FIG. 8, the memory controller 200 may include the mapping data determination unit 210 and the mapping data management unit 220. The mapping data determination unit 210 may determine whether extended mapping data corresponding to a mapping data read request MR_REQ received from the host 300 has been stored in the memory device 100. The mapping data management unit 220 may receive, from the memory device 100, the extended mapping data corresponding to the mapping data read request MR_REQ of the host 300, and output the extended mapping data to the host 300.

In an embodiment, the mapping data determination unit 210 may receive a mapping data read request MG_REQ from the host 300 (①) The mapping data read request MR_REQ may be a request for reading extended mapping data stored in the memory device 100. The extended mapping data may include mapping information indicating a mapping relationship between a logical block address LBA and a physical block address PBA, and additional field information. The additional field information may include information about the number of times the extended mapping data has been updated and/or information for error correction of the extended mapping data.

The mapping data determination unit 210 may output a bitmap request BM_REQ to the memory device 100 based on the mapping data read request MR_REQ received from the host 300 (②). The is mapping data determination unit 210 may receive bitmap information BM_INF corresponding to the bitmap request BM_REQ (③). The mapping data management unit 210 may determine whether to output extended mapping data based on the bitmap information BM_INF.

In an embodiment, the bitmap information BM_INF may include information about a bitmap corresponding to a map segment. The map segment may correspond to a plurality of pieces of extended mapping data. The map segment may include a plurality of pieces of extended mapping data. The bitmap information BM_INF may include information about a decision bit corresponding to the map segment, and a storage position. The decision bit may be a bit indicating whether all of the plurality of pieces of extended mapping data corresponding to the map segment have been generated. The storage position may indicate a position at which the plurality of pieces of extended mapping data corresponding to the map segment have been stored.

In the case where the bitmap information BM_INF corresponding to the map segment is not stored in the memory device 100, the decision bit in the bitmap information BM_INF may be "0". In the case where the bitmap information BM_INF corresponding to the map segment has been stored in the memory device 100, the mapping data determination unit 210 may receive the bitmap information BM_INF including the updated decision bit and the storage position at which the plurality of pieces of extended mapping data included in the map segment are stored.

In an embodiment, the bitmap information BM_INF in the memory device 100 may include information before all of the plurality of pieces of extended mapping data corresponding to the map segment are generated or after they have been generated.

In various embodiments, in the case where all of the plurality of pieces of extended mapping data corresponding to the map segment are not generated, the bitmap information BM_INF may include a decision bit having a default value and storage position information. After all of the plurality of pieces of extended mapping data corresponding to the map segment have been generated, the bitmap information BM_INF may include a decision bit having a specific bit, and storage position information including information about an address in which the extended mapping data are stored.

In FIG. 8, the plurality of pieces of extended mapping data corresponding to the mapping data read request MR_REQ of the host 300 have been stored in the memory device 100. Therefore, the mapping data determination unit 210 may receive information about a bitmap corresponding to at least one map segment including extended mapping data. Here, the bitmap corresponding to the at least one map segment may include a decision bit having a specific value, and information about an address in which the extended mapping data are stored.

The mapping data determination unit 210 may output generation information GE_INF based on the bitmap information BM_INF received from the memory device 100 (④). The generation information GE_INF may include information indicating whether the extended mapping data corresponding to the request received from the host 300 has been stored.

The mapping data management unit 220 may receive the generation information GE_INF from the mapping data determination unit 210. The mapping data management unit 220 may receive the generation information GE_INF, and output extended mapping data corresponding to the request of the host 300. In the case where all of the plurality of pieces of extended mapping data corresponding to the mapping data read request MR_REQ of the host 300 have been stored in the memory device 100, the generation information GE_INF may include information about a decision bit indicating that all of the plurality of pieces of extended mapping data have been generated. The generation information GE_INF may include information about a storage position indicating an address in which the corresponding extended mapping data is stored.

In an embodiment, the mapping data management unit 220 may output, to the memory device 100, a mapping data read command MDR_CMD for outputting extended mapping data corresponding to the mapping data read request MR_REQ of the host 300 (⑤). The mapping data read command MDR_CMD may be determined based on the generation information GE_INF.

If the generation information GE_INF includes information indicating that all of the plurality of pieces of extended mapping data corresponding to the request of the host 300 have been stored, the mapping data management unit 220 may output the mapping data read command MDR_CMD to the memory device 100. The mapping data management unit 220 may output the address, in which the extended mapping data is stored, to the memory device 100 along with the mapping data read command MDR_CMD.

In an embodiment, the mapping data management unit 220 may receive the extended mapping data from the memory device 100 (⑥). In an embodiment, the mapping data management unit 220 may receive a plurality of pieces of extended mapping data from the memory device 100.

In various embodiments, the mapping data management unit 220 may receive, from the memory device 100, the extended mapping data corresponding to the mapping data read command MDR_CMD. The mapping data management unit 220 may receive extended mapping data on a map segment basis. When the mapping data management unit 220 receives the extended mapping data from the memory device 100, the mapping data management unit 220 may receive all of a plurality of pieces of extended mapping data included in one map segment, and thereafter receive a plurality of pieces of extended mapping data included in a subsequent map segment.

The mapping data management unit 220 may output, to the host 300, the extended mapping data received from the memory device 100 (⑦). The mapping data management unit 220 may receive, to the host 300, the extended mapping data corresponding to the mapping data read request MR_REQ received from the host 300. The mapping data management unit 220 may output, to the host 300, the extended mapping data on a map segment basis. In the same manner as when the extended mapping data is received from the memory device 100, the mapping data management unit 220 may output all of a plurality of pieces of extended mapping data in one map segment, and thereafter output a plurality of pieces of extended mapping data in a subsequent map segment to the host 300.

In an embodiment, the host 300 may store, in the host memory 310, the extended mapping data received from the mapping data management unit 220. The extended mapping data may be stored in the host memory 310 on a map segment basis. The host 300 may receive extended mapping data corresponding to a map segment from the mapping data management unit 220, and store the extended mapping data corresponding to the map segment in the host memory 310. The host 300 may store extended mapping data corresponding to one map segment, and thereafter store extended mapping data corresponding to a subsequent map segment.

Figure 9:
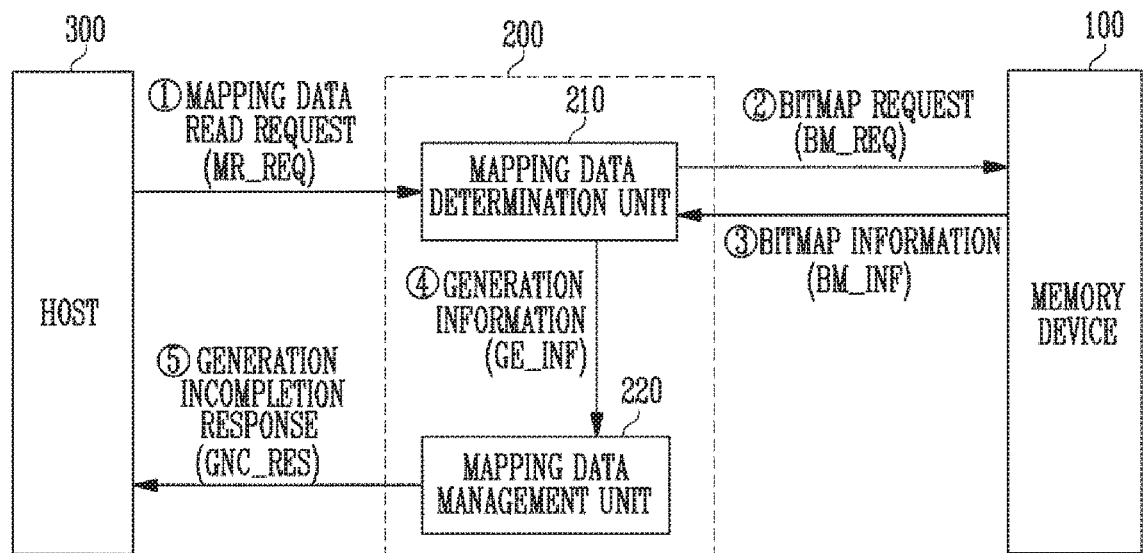
FIG. 9 is a diagram illustrating an operation of a memory controller in accordance with an embodiment of the present disclosure.

FIG. 9 is a diagram illustrating an operation of the memory controller 200 in the case where mapping data corresponding to a request of the host 300 is not present, in accordance with an embodiment of the present disclosure.

Referring to FIG. 9, the memory controller 200 may include the mapping data determination unit 210 and the mapping data management unit 220. The mapping data determination unit 210 may determine whether extended mapping data corresponding to a mapping data read request MR_REQ received from the host 300 has been stored in the memory device 100. The mapping data management unit 220 may output, to the host 300, a response corresponding to the mapping data read request MR_REQ of the host 300.

In an embodiment, the mapping data determination unit 210 may receive a mapping data read request MG_REQ from the host 300 (①). The mapping data read request MR_REQ may be a request for reading extended mapping data stored in the memory device 100. The extended mapping data may include mapping information indicating a mapping relationship between a logical block address LBA and a physical block address PBA, and additional field information. The additional field information may include information about the number of times the mapping relationship between the logical block address LBA and the physical block address PBA has been updated and/or information for error correction of the extended mapping data. The information for error correction may include an error correction bit. The error correction bit may be a parity bit. The parity bit may be a bit added to check whether an error has occurred during an information transmitting process.

The mapping data determination unit 210 may output a bitmap request BM_REQ to the memory device 100 based on the mapping data read request MR_REQ received from the host 300 (②). The mapping data determination unit 210 may receive bitmap information BM_INF corresponding to the bitmap request BM_REQ (③). The mapping data management unit 210 may determine whether to output extended mapping data based on the bitmap information BM_INF.

In an embodiment, the bitmap information BM_INF may include information about a bitmap corresponding to a map segment. The map segment may correspond to a plurality of pieces of extended mapping data. The map segment may include a plurality of pieces of extended mapping data. The bitmap information BM_INF may include information about a decision bit corresponding to the map segment, and a storage position. The decision bit may be a bit indicating whether all of the plurality of pieces of extended mapping data corresponding to the map segment have been generated. The storage position may indicate a position at which the plurality of pieces of extended mapping data corresponding to the map segment have been stored.

In the case where the bitmap information BM_INF corresponding to the map segment is not stored in the memory device 100, the bitmap information BM_INF may include a decision bit having a default value, and a storage position. In the case where the bitmap information BM_INF corresponding to the map segment has been stored in the memory device 100, the mapping data determination unit 210 may receive the bitmap information BM_INF including the updated decision bit and the storage position.

In FIG. 9, some or all of the plurality of pieces of extended mapping data corresponding to the mapping data read request MR_REQ of the host 300 have not been stored in the memory device 100. Therefore, the mapping data determination unit 210 may receive the bitmap information BM_INF including the decision bit of the default value and the storage position, or information about a bitmap corresponding to a map segment including some of the extended mapping data. The bitmap corresponding to the map segment including some of the extended mapping data may include a decision bit having a specific value, and information about an address in which the extended mapping data are stored.

The mapping data determination unit 210 may output generation information GE_INF based on the bitmap information BM_INF received from the memory device 100 (④). The generation information GE_INF may include information indicating whether the extended mapping data corresponding to the request received from the host 300 has been stored.

The mapping data management unit 220 may receive the generation information GE_INF from the mapping data determination unit 210. The mapping data management unit 220 may receive the generation information GE_INF, and output extended mapping data corresponding to the request of the host 300. However, in FIG. 9, since all or some of the extended mapping data corresponding to the mapping data read request MR_REQ have not been stored in the memory device 100, the mapping data determination unit 210 may output generation information GE_INF including information indicating that generation of the extended mapping data corresponding to the request of the host 300 has not been completed.

If the mapping data management unit 220 receives the generation information GE_INF from the mapping data determination unit 210, the mapping data management unit 220 may output a generation incompletion response GNC_RES to the host 300. In an embodiment, the generation information GE_INF may include information indicating that all of the plurality of pieces of extended mapping data corresponding to the internal operation of the memory controller 200 or the mapping data generation request MG_REQ received from the host 300 have not been generated. The mapping data management unit 220 may output, to the host 300, the generation incompletion response GNC_RES indicating that all of the plurality of pieces of extended mapping data corresponding to the request received from the host 300 have not been generated (⑤).

After the generation incompletion response GNC_RES has been received from the mapping data management unit 220, the host 300 may output a mapping data generation request MG_REQ for generating extended mapping data that has not yet been generated. The mapping data management unit 220 may generate the extended mapping data based on the mapping data generation request MG_REQ received from the host 300.

Figure 10:
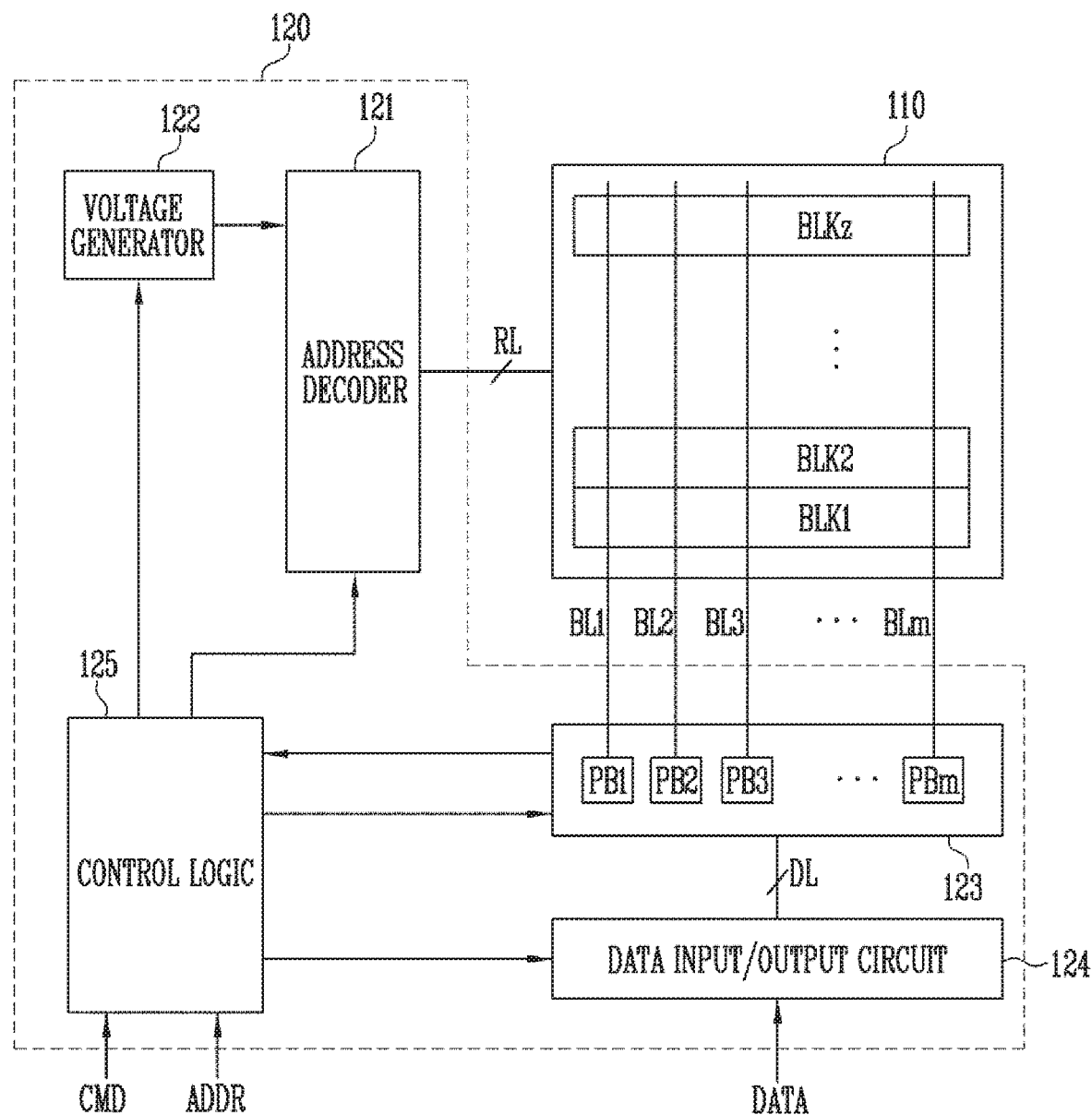
FIG. 10 is a block diagram illustrating the memory device of FIG. 1.

FIG. 10 is a block diagram illustrating a memory device in accordance with an embodiment of the present disclosure, for example the memory device 100 of FIG. 1.

Referring to FIG. 10, the memory device 100 may include a memory cell array 110, and a peripheral circuit 120. The peripheral circuit 120 may include an address decoder 121, a voltage generator 122, a read and write (read/write) circuit 123, a data input and output (input/output) circuit 124, and a control logic 125.

The memory cell array 110 may include a plurality of memory blocks BLK1 to BLKz. The memory blocks BLK1 to BLKz are connected to the address decoder 121 through row lines RL and connected to the read/write circuit 123 through bit lines BL1 to BLm. Each of the memory blocks BLK1 to BLKz may include a plurality of memory cells. In an embodiment, the plurality of memory cells may be nonvolatile memory cells.

A plurality of memory cells in the memory cell array 110 may be divided into a plurality of blocks according to the purpose of use. System information such as various setting information required to control the memory device 100 may be stored in the plurality of blocks.

Each of the first to z-th memory blocks BLK1 to BLKz includes a plurality of memory cell strings. First to m-th cell strings are respectively coupled to the first to m-th bit lines BL1 to BLm. Each of the first to m-th cell strings includes a drain select transistor, a plurality of memory cells coupled in series to each other, and a source select transistor. The drain select transistor DST is coupled to a drain select line DSL. First to n-th memory cells are respectively coupled to first to n-th word lines. The source select transistor SST is coupled to a source select line SSL. A drain of the drain select transistor DST is coupled to the corresponding bit line. The drain select transistors DST of the first to m-th cell strings are respectively coupled to the first to m-th bit lines BL1 to BLm. A source of the source select transistor SST is coupled to a common source line CSL. In an embodiment, the common source line CSL may be coupled in common to the first to z-th memory blocks BLK1 to BLKz. The drain select line DSL, the first to n-th word lines WL1 to WLn, and the source select line SSL are included in the row lines RL. The drain select line DSL, the first to n-th word lines WL1 to WLn, and the source select line SSL are controlled by the address decoder 121. The common source line CSL is controlled by the control logic 125. The first to m-th bit lines BL1 to BLm are controlled by the read/write circuit 123.

The address decoder 121 is coupled to the memory cell array 110 through the row lines RL. The address decoder 121 may operate under control of the control logic 125. The address decoder 121 receives addresses ADDR through the control logic 125.

In an embodiment, a program operation and a read operation of the memory device 100 may be performed on a page basis.

During the program operation or the read operation, addresses ADDR received by the control logic 125 may include a block address and a row address. The address decoder 121 may decode a block address among the received addresses ADDR. The address decoder 121 may select a corresponding one of the memory blocks BLK1 to BLKz in response to the decoded block address.

The address decoder 121 may decode a row address among the received addresses ADDR. In response to the decoded row address, the address decoder 121 may apply voltages, provided from the voltage generator 122, to the row lines RL and select one word line of the selected memory block.

During an erase operation, the addresses ADDR may include a block address. The address decoder 121 may decode the block address and select one memory block according to the decoded block address. The erase operation may be performed on the entirety or a portion of one memory block.

During a partial erase operation, the addresses ADDR may include block and row addresses. The address decoder 121 may select a corresponding one of the memory blocks BLK1 to BLKz in response to the decoded block address.

The address decoder 121 may decode row addresses among the received addresses ADDR. In response to the decoded row addresses, the address decoder 121 may apply voltages, provided from the voltage generator 122, to the row lines RL and select at least one word line of the selected memory block.

In an embodiment, the address decoder 121 may include a block decoder, a word line decoder, and an address buffer.

The voltage generator 122 may generate a plurality of voltages using an external supply voltage supplied to the memory device 100. The voltage generator 122 may operate under control of the control logic 125.

In an embodiment, the voltage generator 122 may generate an internal supply voltage by regulating the external supply voltage. The internal supply voltage generated from the voltage generator 122 may be used as an operating voltage of the memory device 100.

In an embodiment, the voltage generator 122 may generate a plurality of voltages using the external supply voltage or the internal supply voltage. For example, the voltage generator 122 may include a plurality of pumping capacitors for receiving the internal supply voltage, and generate a plurality of voltages by selectively activating the plurality of pumping capacitors under control of the control logic 125. The generated voltages are applied to selected word lines by the address decoder 121.

During a program operation, the voltage generator 122 may generate a program pulse having a high voltage and a pass pulse lower in voltage level than the program pulse. During a read operation, the voltage generator 122 may generate a read voltage and a pass voltage higher than the read voltage. During an erase operation, the voltage generator 122 may generate an erase voltage.

The read/write circuit 123 may include first to m-th page buffers PB1 to PBm. The first to math page buffers PB1 to PBm are coupled to the memory cell array 110 through the first to m-th bit lines BL1 to BLm, respectively. The first to math page buffers PB1 to PBm may operate under control of the control logic 125.

The first to m-th page buffers PB1 to PBm may perform data communication with the data input/output circuit 124. During a program operation, the first to math page buffers PB1 to PBm may receive data DATA to be stored through the data input/output circuit 124 and data lines DL.

During the program operation, the first to math page buffers PB1 to PBm may transmit the data, received through the data input/output circuit 124, to selected memory cells through the bit lines BL1 to BLm when a program pulse is applied to a selected word line. The memory cells in the selected page are programmed based on the transmitted data. A memory cell coupled to a bit line to which a program enable voltage (e.g. a ground voltage) is applied may have an increased threshold voltage. The threshold voltage of a memory cell coupled to a bit line to which a program inhibit voltage (for example, a supply voltage) is applied may be retained. During a program verify operation, the first to m-th page buffers PB1 to PBm may read page data from selected memory cells through the bit lines BL1 to BLm.

During a read operation, the read/write circuit 123 may read data DATA from the memory cells in the selected page through the bit lines BL, and output the read data DATA to the data input/output circuit 124. During an erase operation, the read/write circuit 123 may float the bit lines BL.

In an embodiment, the read/write circuit 123 may include a column select circuit.

The data input/output circuit 124 is coupled to the first to m-th page buffers PB1 to PBm through the data lines DL. The data input/output circuit 124 may operate under control of the control logic 125. During a program operation, the data input/output circuit 124 may receive data to be stored from an external controller (not shown).

The control logic 125 is connected to the address decoder 121, the voltage generator 122, the read/write circuit 123, and the data input/output circuit 124. The control logic 125 may control overall operations of the memory device 100. The control logic 125 may receive a command CMD and addresses ADDR from the external controller. The control logic 125 may control the address decoder 121, the voltage generator 122, the read/write circuit 123, and the data input/output circuit 124 in response to the command CMD.

Figure 11:
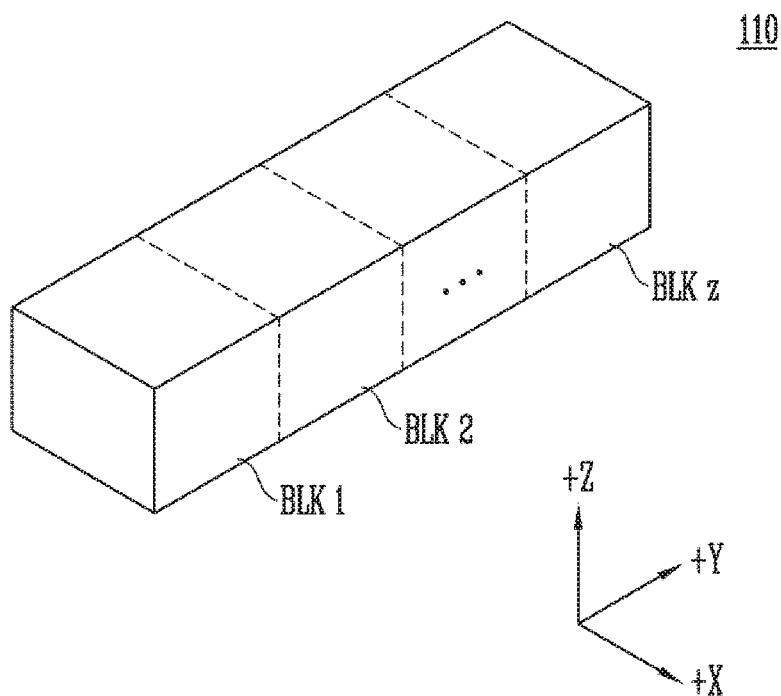
FIG. 11 is a diagram illustrating an example of a memory cell array of FIG. 10.

FIG. 11 is a diagram illustrating an example of a memory cell array in accordance with an embodiment of the present disclosure, for example, the memory cell array 110 of FIG. 10.

Referring to FIG. 11, the memory cell array 110 may include a plurality of memory blocks BLK1 to BLKz. Each memory block may have a three-dimensional structure. Each memory block may include a plurality of memory cells stacked on a substrate. The memory cells are arranged in a +X direction, a +Y direction, and a +Z direction. The structure of each memory block will be described in more detail with reference to FIGS. 12 and 13.

Figure 12:
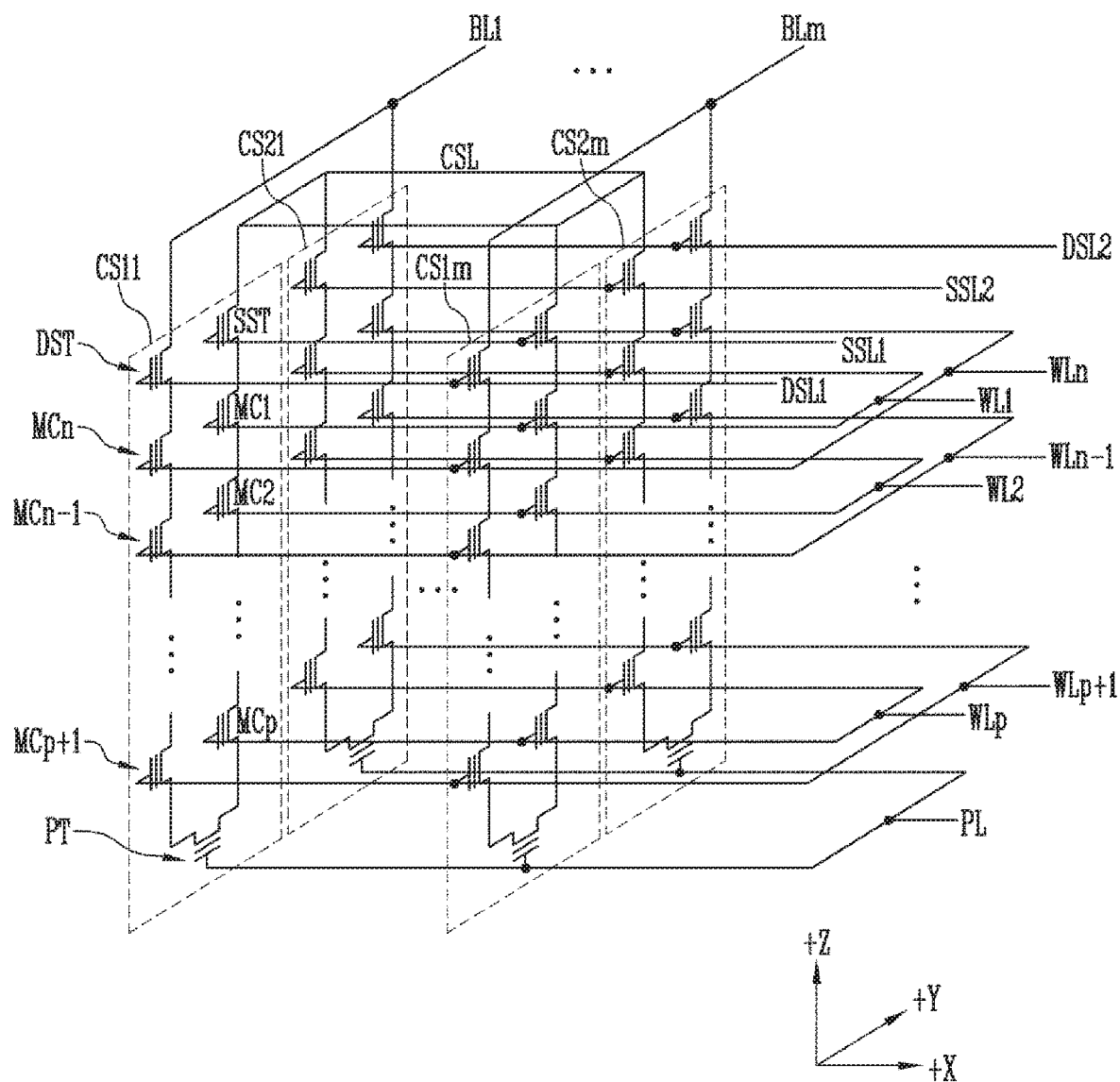
FIG. 12 is a circuit diagram illustrating a memory block of a plurality of memory blocks in accordance with an embodiment of the present disclosure.

FIG. 12 is a circuit diagram illustrating a memory block in accordance with an embodiment of the present disclosure, for example, a memory block BLKa of a plurality of memory blocks BLK1 to BLKz of FIG. 11.

Referring to FIG. 12, the memory block BLKa may include a plurality of cell strings CS11 to CS1*m* and CS21 to CS2*m*. In an embodiment, each of the cell strings CS11 to CS1*m* and CS21 to CS2*m* may be formed in a 'U' shape. In the memory block BLKa, m cell strings may be arranged in a row direction (i.e., the +X direction). In FIG. 12, two cell strings are illustrated as being arranged in a column direction (i.e., the +Y direction). However, this illustration is made only for convenience, and it will be understood that three or more cell strings may be arranged in the column direction.

Each of the plurality of cell strings CS11 to CS1m and CS21 to CS2m may include at least one source select transistor SST, first to n-th memory cells MC1 to MCn, a pipe transistor PT, and at least one drain select transistor DST.

The select transistors SST and DST and the memory cells MC1 to MCn may have similar structures, respectively. In an embodiment, each of the select transistors SST and DST and the memory cells MC1 to MCn may include a channel layer, a tunneling insulating layer, a charge storage layer, and a blocking insulating layer. In an embodiment, a pillar for providing the channel layer may be provided in each cell string. In an embodiment, a pillar for providing at least one of the channel layer, the tunneling insulating layer, the charge storage layer, and the blocking insulating layer may be provided in each cell string.

The source select transistor SST of each cell string is coupled between the common source line CSL and the memory cells MC1 to MCp.

In an embodiment, source select transistors of cell strings arranged in the same row are coupled to a source select line extending in a row direction, and source select transistors of cell strings arranged in different rows are coupled to different source select lines. In FIG. 12, source select transistors of the cell strings CS11 to CS1m in a first row are coupled to a first source select line SSL1. Source select transistors of the cell strings CS21 to CS2m in a second row are coupled to a second source select line SSL2.

In an embodiment, the source select transistors of the cell strings CS11 to CS1m and CS21 to CS2m may be coupled in common to a single source select line.

The first to n-th memory cells MC1 to MCn in each cell string are coupled between the source select transistor SST and the drain select transistor DST.

The first to n-th memory cells MC1 to MCn may be divided into first to p-th memory cells MC1 to MCp and (p+1)-th to n-th memory cells MCp+1 to MCn. The first to p-th memory cells MC1 to MCp are successively arranged in a direction opposite to the +Z direction and are coupled in series between the source select transistor SST and the pipe transistor PT. The (p+1)-th to n-th memory cells MCp+1 to MCn are successively arranged in the +Z direction and are coupled in series between the pipe transistor PT and the drain select transistor DST. The first to p-th memory cells MC1 to MCp and the (p+1)-th to n-th memory cells MCp+1 to MCn are coupled to each other through the pipe transistor PT. The gates of the first to n-th memory cells MC1 to MCn of each cell string are coupled to first to n-th word lines WL1 to WLn, respectively.

Respective gates of the pipe transistors PT of the cell strings are coupled to a pipeline PL.

The drain select transistor DST of each cell string is coupled between the corresponding bit line and the memory cells MCp+1 to MCn. The cell strings arranged in the row direction are coupled to drain select lines extending in the row direction. Drain select transistors of the cell strings CS11 to CS1m in the first row are coupled to a first drain select line DSL1. Drain select transistors of the cell strings CS21 to CS2m in the second row are coupled to a second drain select line DSL2.

Cell strings arranged in the column direction may be coupled to bit lines extending in the column direction. In FIG. 12, cell strings CS11 and CS21 in a first column are coupled to a first bit line BL1. Cell strings CS1m and CS2m in an m-th column are coupled to an m-th bit line BLm.

Memory cells coupled to the same word line in cell strings arranged in the row direction form a single page. For example, memory cells coupled to the first word line WL1, among the cell strings CS11 to CS1m in the first row, form a single page. Memory cells coupled to the first word line WL1, among the cell strings CS21 to CS2m in the second row, form another single page. When any one of the drain select lines DSL1 and DSL2 is selected, corresponding cell strings arranged in the direction of a single row may be selected. When any one of the word lines WL1 to WLn is selected, a corresponding single page may be selected from among the selected cell strings.

In an embodiment, even bit lines and odd bit lines may be provided in lieu of the first to m-th bit lines BL1 to BLm. Even-number-th cell strings of the cell strings CS11 to CS1m or CS21 to CS2m arranged in the row direction may be coupled to respective even bit lines. Odd-number-th cell strings of the cell strings CS11 to CS1m or CS21 to CS2m arranged in the row direction may be coupled to respective odd bit lines.

In an embodiment, at least one of the first to n-th memory cells MC1 to MCn may be used as a dummy memory cell. For example, at least one or more dummy memory cells may be provided to reduce an electric field between the source select transistor SST and the memory cells MC1 to MCp. Alternatively, at least one or more dummy memory cells may be provided to reduce an electric field between the drain select transistor DST and the memory cells MCp+1 to MCn. As the number of dummy memory cells is increased, the reliability in operation of the memory block BLKa may be increased, while the size of the memory block BLKa may be increased. As the number of dummy memory cells is reduced, the size of the memory block BLKa may be reduced, but the reliability in operation of the memory block BLKa may be reduced.

To efficiently control the at least one dummy memory cells, each of the dummy memory cells may have a required threshold voltage. Before or after an erase operation on the memory block BLKa is performed, program operations may be performed on all or some of the dummy memory cells. In the case where an erase operation is performed after a program operation has been performed, the dummy memory cells may have required threshold voltages by controlling voltages to be applied to the dummy word lines coupled to the respective dummy memory cells.

Figure 13:
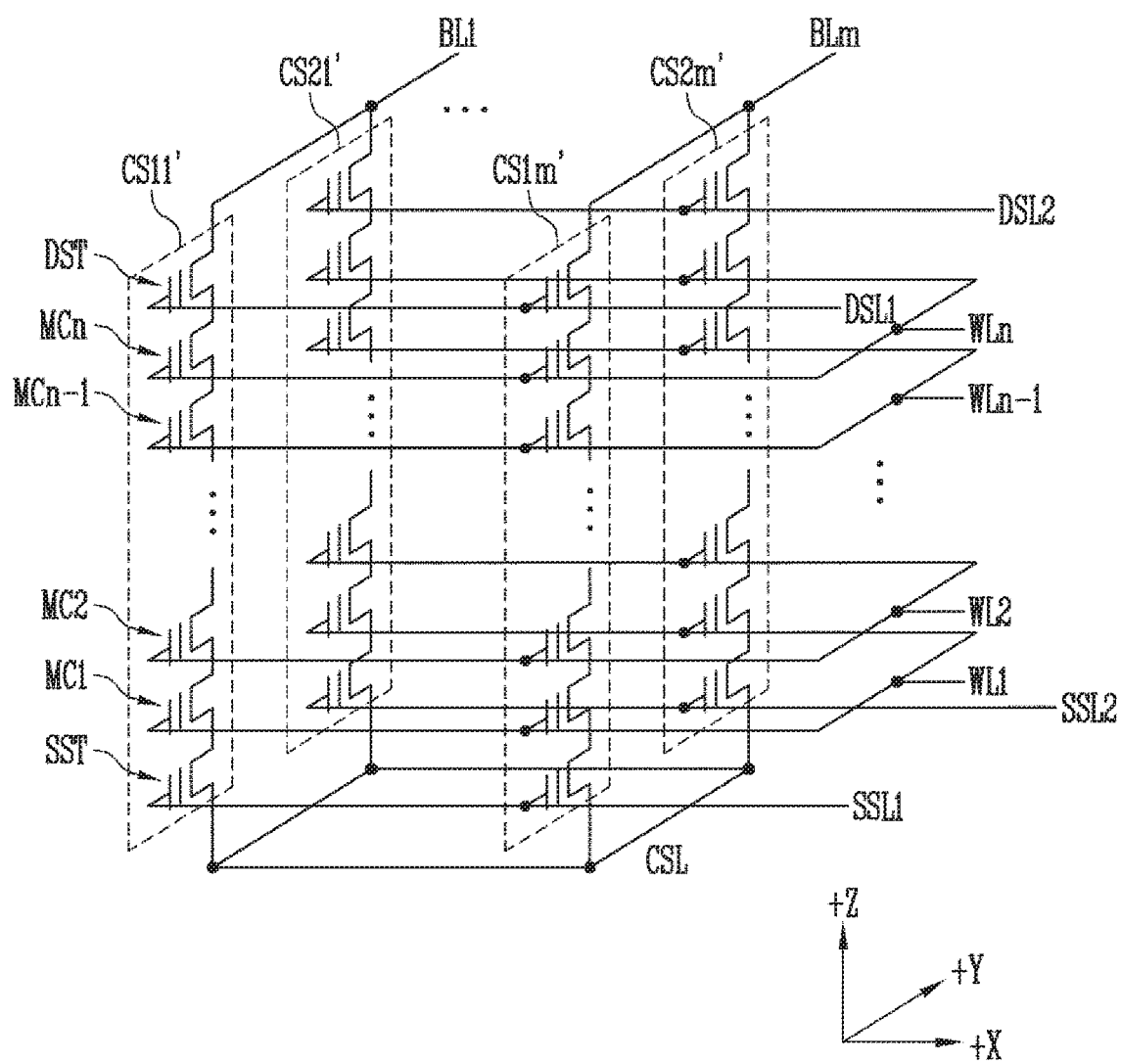
FIG. 13 is a circuit diagram illustrating a memory block of a plurality of memory blocks in accordance with an embodiment of the present disclosure.

FIG. 13 is a circuit diagram illustrating a memory block in accordance with an embodiment of the present disclosure, for example, a memory block BLKb of a plurality of memory blocks BLK1 to BLKz of FIG. 11.

Referring to FIG. 13, the memory block BLKb may include a plurality of cell strings CS11' to CS1m' and CS21' to CS2m'. Each of the cell strings CS11' to CS1m' and CS21' to CS2m' extends in the +Z direction. Each of the cell strings CS11' to CS1m' and CS21' to CS2m' may include at least one source select transistor SST, first to n-th memory cells MC1 to MCn, and at least one drain select transistor DST which are stacked on a substrate (not shown) provided in a lower portion of the memory block BLK1'.

The source select transistor SST of each cell string is coupled between the common source line CSL and the memory cells MC1 to MCn. The source select transistors of cell strings arranged in the same row are coupled to the same source select line. Source select transistors of the cell strings CS11' to CS1m' arranged in a first row may be coupled to a first source select line SSL1. Source select transistors of the cell strings CS21' to CS2m' arranged in a second row may be coupled to a second source select line SSL2. In an embodiment, source select transistors of the cell strings CS11' to CS1m' and CS21' to CS2m' may be coupled in common to a single source select line.

The first to n-th memory cells MC1 to MCn in each cell string are coupled in series between the source select transistor SST and the drain select transistor DST. Gates of the first to n-th memory cells MC1 to MCn are respectively coupled to first to n-th word lines WL1 to WLn.

The drain select transistor DST of each cell string is coupled between the corresponding bit line and the memory cells MC1 to MCn. Drain select transistors of cell strings arranged in the row direction may be coupled to drain select lines extending in the row direction. Drain select transistors of the cell strings CS11' to CS1m' in the first row are coupled to a first drain select line DSL1. Drain select transistors of the cell strings CS21' to CS2m' in the second row may be coupled to a second drain select line DSL2.

Consequentially, the memory block BLKb of FIG. 13 may have an equivalent circuit similar to that of the memory block BLKa of FIG. 12 except that a pipe transistor PT is excluded from each cell string.

In an embodiment, even bit lines and odd bit lines may be provided in lieu of the first to m-th bit lines BL1 to BLm. Even-number-th cell strings among the cell strings CS11' to CS1m' or CS21' to CS2m' arranged in the row direction may be coupled to the respective even bit lines, and odd-number-th cell strings among the cell strings CS11' to CS1m' or CS21' to CS2m' arranged in the row direction may be coupled to the respective odd bit lines.

In an embodiment, at least one of the first to n-th memory cells MC1 to MCn may be used as a dummy memory cell. For example, at least one or more dummy memory cells may be provided to reduce an electric field between the source select transistor SST and the memory cells MC1 to MCn. Alternatively, at least one or more dummy memory cells may be provided to reduce an electric field between the drain select transistor DST and the memory cells MC1 to MCn. As the number of dummy memory cells is increased, the reliability in operation of the memory block BLKb may be increased, while the size of the memory block BLKb may be increased. As the number of dummy memory cells is reduced, the size of the memory block BLKb may be reduced, but the reliability in operation of the memory block BLKb may be reduced.

To efficiently control the at least one dummy memory cells, each of the dummy memory cells may have a required threshold voltage. Before or after an erase operation on the memory block BLKb is performed, program operations may be performed on all or some of the dummy memory cells. In the case where an erase operation is performed after a program operation has been performed, the dummy memory cells may have required threshold voltages by controlling voltages to be applied to the dummy word lines coupled to the respective dummy memory cells.

Figure 14:
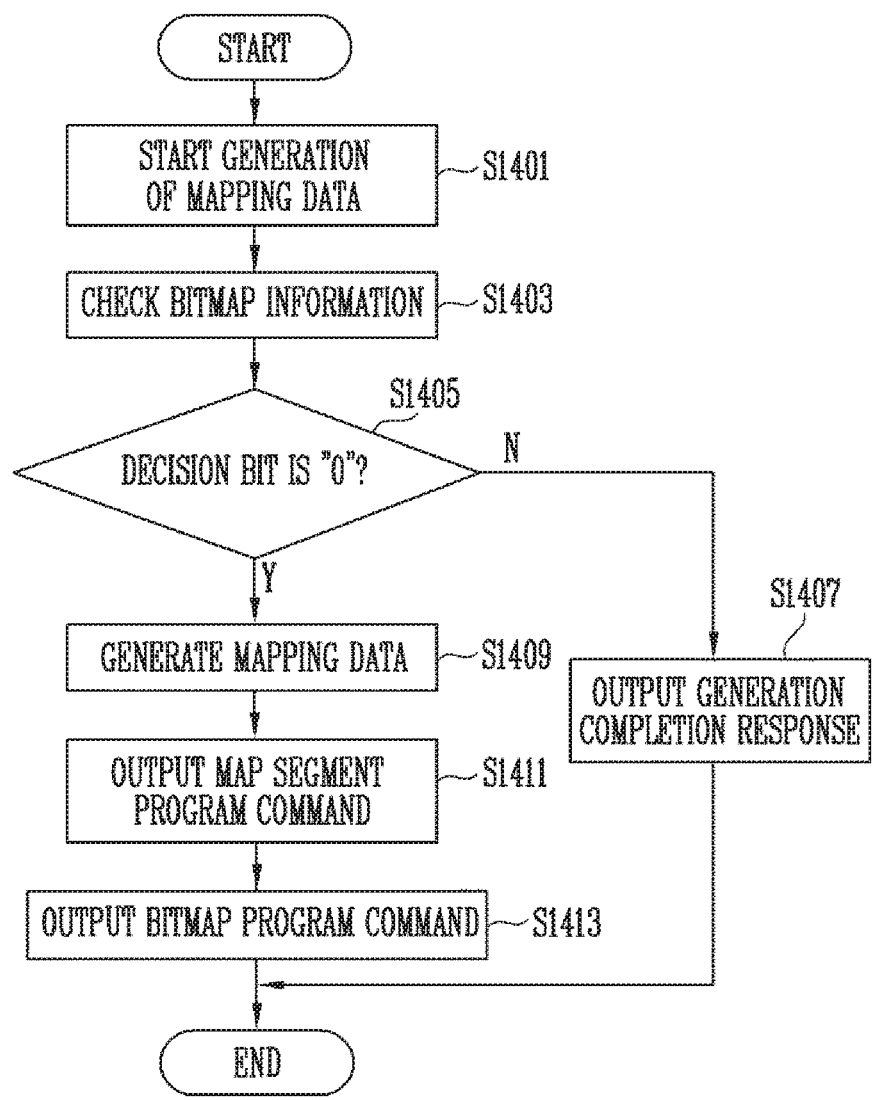
FIG. 14 is a diagram illustrating an operation of a memory controller in accordance with an embodiment of the present disclosure.

FIG. 14 is a diagram illustrating an operation of a memory controller (e.g., the memory controller 200 of FIGS. 1 to 7) in accordance with an embodiment of the present disclosure.

Referring to FIG. 14, at step S1401, the mapping data management unit 220 may start generation of mapping data. The mapping data management unit 220 may start the generation of the mapping data in response to a mapping data generation request MG_REQ received from the host 300 or an internal operation of the memory controller 200.

In an embodiment, the mapping data determination unit 210 may receive a mapping data generation request MG_REQ from the host 300. The mapping data generation request MG_REQ may be an extended mapping data request. The extended mapping data request may be a request for generating or reading extended mapping data. The extended mapping data may include mapping information indicating a mapping relationship between a logical block address LBA and a physical block address PBA, and additional field information.

At step S1403, the mapping data determination unit 210 may determine bitmap information BM_INF from the memory device 100. In various embodiments, the mapping data determination unit 210 may output a bitmap request BM_REQ to the memory device 100 based on the mapping data generation request MG_REQ received from the host 300 or the internal operation of the memory controller 200. The mapping data determination unit 210 may receive bitmap information BM_INF corresponding to the bitmap request BM_REQ, and determine whether to generate extended mapping data based on the bitmap information BM_INF.

At step S1405, the mapping data determination unit 210 may determine whether the decision bit has a logic low level "0". The mapping data determination unit 210 may determine whether the decision bit includes a default value "0". The decision bit may be a bit included in a bitmap. The decision bit may be a bit indicating whether all of a plurality of pieces of extended mapping data corresponding to a map segment have been generated.

The mapping data determination unit 210 may receive the bitmap information BM_INF from the memory device 100. Further, the mapping data determination unit 210 may determine whether the extended mapping data has been stored in the memory device 100 based on the bitmap information BM_INF. When it is determined that the decision bit is not a logic low level "0", i.e., if the decision bit has a logic high level "1" (S1405, N), the process proceeds to step S1407. When it is determined that the decision bit is "0" (S1405, Y), the process proceeds to step S1409.

At step S1407, the mapping data management unit 220 may output a generation completion response GC_RES to the host 300. In various embodiments, when it is determined that the decision bit in the bitmap information BM_INF is not a logic low level "0", i.e., when it is determined that the decision bit is not a default value, the bitmap information BM_INF may indicate that all of the plurality of pieces of extended mapping data have been generated and stored in the memory device 100. When it is determined that all of the plurality of pieces of extended mapping data have been generated, the mapping data management unit 220 may output the generation completion response GC_RES to the host 300 because it is unnecessary to generate mapping data.

Consequently, when the mapping data management unit 220 receives the generation information GE_INF from the mapping data determination unit 210, the mapping data management unit 220 may output the generation completion response GC_RES to the host 300. The generation information GE_INF may include information indicating that all of the plurality of pieces of extended mapping data corresponding to the mapping data generation request MG_REQ received from the host 300 or the internal operation of the memory controller 200 have been generated.

At step S1409, the mapping data management unit 220 may generate mapping data. The mapping data may be extended mapping data. In an embodiment, the mapping data management unit 220 may generate extended mapping data on a map segment basis. The map segment may include a plurality of pieces of extended mapping data. When the plurality of pieces of extended mapping data included in the map segment are generated, the mapping data management unit 220 may output the generated extended mapping data to the memory device 100.

At step S1411, the mapping data management unit 220 may output a map segment program command MSP_CMD to the memory device 100. The map segment program command MSP_CMD may be a command for storing the plurality of pieces of extended mapping data generated by the mapping data management unit 220 in the memory device 100.

In various embodiments, the mapping data management unit 220 may output the map segment program command MSP_CMD to the memory device 100 when generation of the plurality of pieces of extended mapping data is completed. Each time generation of extended mapping data in a map segment is completed, a command for storing the extended mapping data corresponding to the map segment may be output. In an embodiment, when generation of extended mapping data in one map segment is completed, the extended mapping data corresponding to the map segment is stored in the memory device 100. Subsequently, the mapping data management unit 220 may generate extended mapping data corresponding to a subsequent map segment.

At step S1413, the mapping data management unit 220 may output a bitmap program command BMP_CMD to the memory device 100. The bitmap program command BMP_CMD may be output after all of the plurality of pieces of extended mapping data corresponding to the map segment program command MSP_CMD have been stored in the memory device 100. The bitmap program command BMP_CMD may be output after the map segment program command MSP_CMD has been output. The memory device 100 may receive the bitmap program command BMP_CMD and update the bitmap.

In various embodiments, the bitmap may be updated to indicate that all of the plurality of pieces of extended mapping data corresponding to the map segment have been stored. When the memory device 100 receives the bitmap program command BMP_CMD, the bitmap corresponding to the map segment in the memory device 100 may be updated. In an embodiment, the decision bit in the bitmap may be updated from the default value to a specific value. Furthermore, information about the position at which the plurality of pieces of extended mapping data corresponding to the map segment are stored may be updated.

Figure 15:
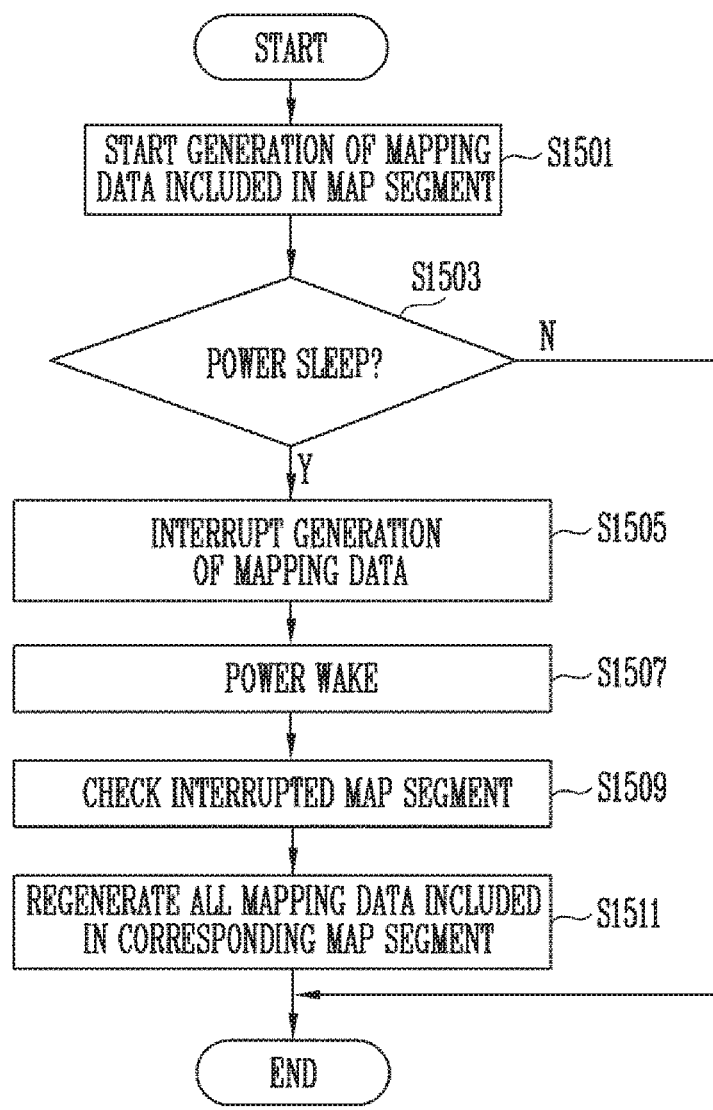
FIG. 15 is a diagram illustrating an operation of a memory controller in accordance with an embodiment of the present disclosure.

FIG. 15 is a diagram illustrating an operation of a memory controller (e.g., the memory controller 200 of FIGS. 1 and 2) in accordance with an embodiment of the present disclosure.

Referring to FIG. 15, at step S1501, the mapping data management unit 220 may start generation of mapping data included in a map segment. In various embodiments, the map segment may include a plurality of pieces of mapping data. The plurality of pieces of mapping data may be a plurality of pieces of extended mapping data to be generated in response to an internal operation of the memory controller 200 or a mapping data generation request MG_REQ of the host 300.

In an embodiment, the extended mapping data may include mapping information indicating a mapping relationship between a logical block address LBA and a physical block address PBA, and additional field information. The additional field information may include information about the number of times the mapping relationship between the logical block address LBA and the physical block address PBA has been updated and/or information for error correction of the extended mapping data. The information for error correction may include an error correction bit. The error correction bit may be a parity bit. The parity bit may be a bit added to check whether an error has occurred during an information transmitting process.

At step S1503, it is determined whether a current operation state of the storage device 50 is a power sleep mode. The power sleep mode may mean that the storage device 50 operates in a low-power state. When it is determined that the storage device 50 operates in the power sleep mode, extended mapping data that are being generated by the mapping data management unit 220 may be deleted. In the case where the current operation state of the storage device 50 is the power sleep mode, the process proceeds to step S1505.

At step S1505, the mapping data management unit 220 may interrupt the generation of mapping data. In other words, when it is determined that the storage device 50 operates in the low-power state, the mapping data management unit 220 may interrupt the generation of mapping data. In the case where the storage device 50 is in the power sleep mode, the storage device 50 may perform only a minimal operation.

At step S1507, the state of the storage device 50 may be a power wake state. The power wake state may mean that the storage device 50 may operate in a normal power state. When it is determined that the storage device 50 may operate in the normal power state, the mapping data management unit 220 may generate extended mapping data again.

At step S1509, when the storage device 50 operates in the normal power state, the mapping data determination unit 210 may receive bitmap information BM_INF from the memory device 100. The mapping data determination unit 210 may output generation information GE_INF to the mapping data management unit 220 based on the bitmap information BM_INF.

The mapping data determination unit 210 may check, through the decision bit in the bitmap information BM_INF, map segments corresponding to generation-completed extended mapping data. Based on a decision bit of a bitmap corresponding to each map segment, generation-completed extended mapping data may be checked. Furthermore, the mapping data management unit 220 may check map segments corresponding to generation-interrupted extended mapping data. Based on a decision bit of a bitmap corresponding to each map segment, generation-interrupted extended mapping data may be checked.

At step S1511, the mapping data management unit 220 may regenerate all of the mapping data included in the corresponding map segment. The mapping data management unit 220 may regenerate the extended mapping data that has been generation-interrupted and is included in the map segment, based on generation information GE_INF received from the mapping data determination unit 210. The generation information GE_INF may include information indicating whether the extended mapping data corresponding to the request received from the host 300 has been stored.

In an embodiment, the memory controller 200 may include a buffer memory as a volatile random access memory (RAM) for storing mapping data. Since the memory controller 200 includes the volatile RAM, mapping data that is being generated may be deleted when the storage device 50 operates in the power sleep mode. However, each time extended mapping data corresponding to the map segment is generated, the extended mapping data is stored in the memory device 100. Hence, the mapping data management unit 220 may generate extended mapping data other than the extended mapping data that is stored in the memory device 100. Therefore, mapping data other that the extended mapping data that is stored in the memory device 100 may be generated.

Figure 16:
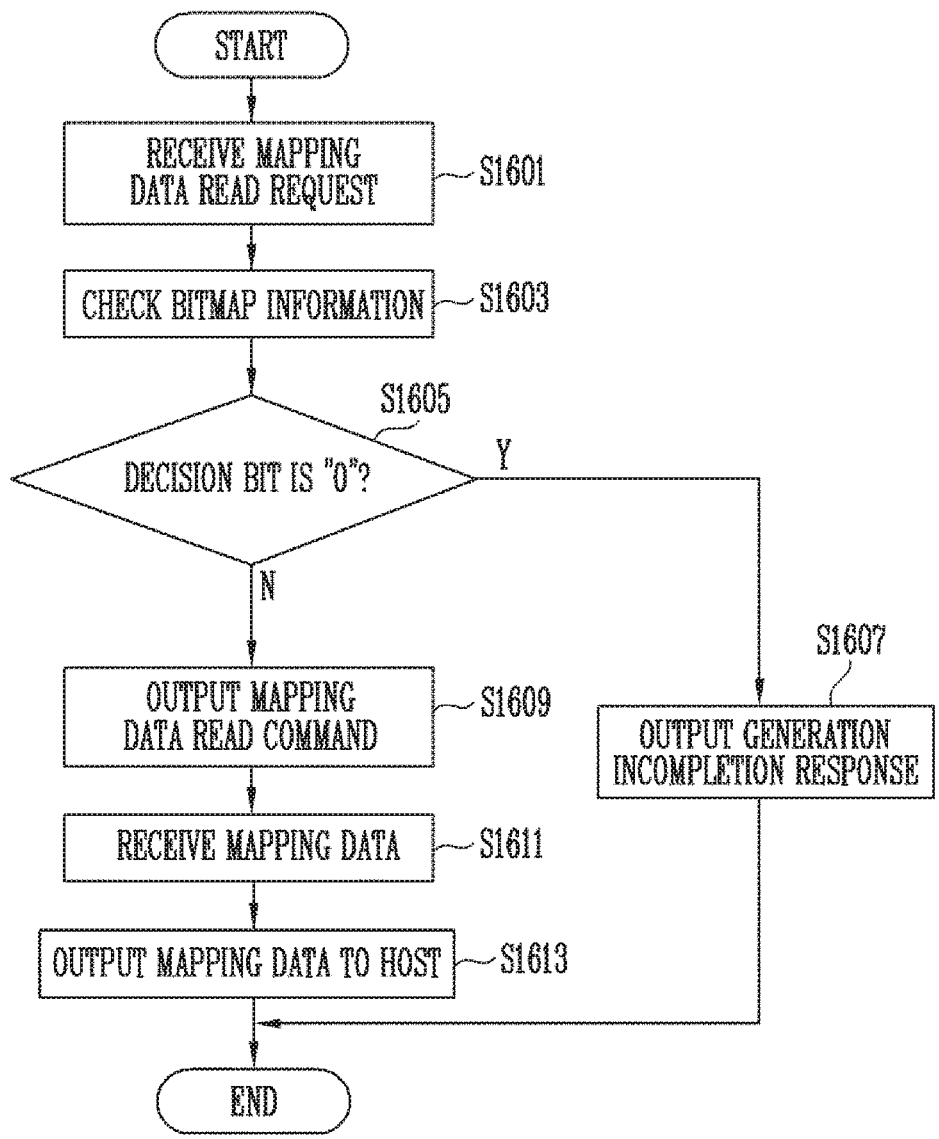
FIG. 16 is a diagram illustrating an operation of a memory controller in accordance with an embodiment of the present disclosure.

FIG. 16 is a diagram illustrating the operation of a memory controller (e.g., the memory controller 200 of FIGS. 1, 8 and 9) in accordance with an embodiment of the present disclosure.

Referring to FIG. 16, at step S1601, the mapping data determination unit 210 may receive a mapping data read request MR_REQ from the host 300. The mapping data read request MR_REQ may be a request for reading extended mapping data stored in the memory device 100. The extended mapping data may include mapping information indicating a mapping relationship between a logical block address LBA and a physical block address PBA, and additional field information. The additional field information may include information about the number of times the extended mapping data has been updated and/or information for error correction of the extended mapping data.

At step S1603, the mapping data determination unit 210 may check bitmap information BM_INF received from the memory device 100. In various embodiments, the mapping data determination unit 210 may output a bitmap request BM_REQ to the memory device 100 based on the mapping data read request MR_REQ received from the host 300. The mapping data determination unit 210 may receive bitmap information BM_INF corresponding to the bitmap request BM_REQ. The mapping data management unit 210 may determine whether to generate extended mapping data based on the bitmap information BM_INF.

At step S1605, the mapping data determination unit 210 may determine whether the decision bit is a logic low level "0". The mapping data determination unit 210 may determine whether the decision bit includes a default value. The decision bit may be a bit included in the bitmap. The decision bit may be a bit indicating whether all of a plurality of pieces of extended mapping data corresponding to a map segment have been generated.

The mapping data determination unit 210 may receive the bitmap information BM_INF from the memory device 100. Further, the mapping data determination unit 210 may determine whether the extended mapping data corresponding to the mapping data read request MR_REQ of the host 300 has been stored in the memory device 100, using the decision bit. When it is determined that the decision bit is not "0", i.e., when the decision bit is "1" (S1605, N), the process proceeds to step S1609. When it is determined that the decision bit is "0" (S1605, Y), the process proceeds to step S1607.

At step S1607, the mapping data management unit 220 may output a generation incompletion response GNC_RES to the host 300. In various embodiments, in the case where the bitmap information BM_INF includes information indicating that the mapping data has not been generated, all or some of the plurality of pieces of extended mapping data corresponding to the mapping data read request MR_REQ may not be stored in the memory device 100. In the case where all or some of the plurality of pieces of extended mapping data corresponding to the mapping data read request MR_REQ have not been stored in the memory device 100, the mapping data determination unit 210 may output generation information GE_INF including information indicating that generation of the extended mapping data has not been completed.

When the generation information GE_INF is received from the mapping data determination unit 210, the mapping data management unit 220 may output a generation incompletion response GNC_RES to the host 300. In an embodiment, the generation information GE_INF may include information indicating that all of the plurality of pieces of extended mapping data corresponding to the mapping data read request MR_REQ received from the host 300 or the internal operation of the memory controller 200 have not been generated. The mapping data management unit 220 may output, to the host 300, the generation incompletion response GNC_RES indicating that all of the plurality of pieces of extended mapping data corresponding to the request received from the host 300 or the internal operation of the memory controller 200 have not been generated.

At step S1609, the mapping data management unit 220 may output a map data read command MDR_CMD to the memory device 100. In various embodiments, the mapping data management unit 220 may output a mapping data read command MDR_CMD for outputting extended mapping data corresponding to the mapping data read request MR_REQ of the host 300. The mapping data read command MDR_CMD may be determined based on the generation information GE_INF.

When the generation information GE_INF includes information indicating that all of the plurality of pieces of extended mapping data corresponding to the request of the host 300 have been stored, the mapping data management unit 220 may output the mapping data read command MDR_CMD to the memory device 100. The mapping data management unit 220 may output the address, in which the extended mapping data is stored, to the memory device 100 along with the mapping data read command MDR_CMD.

At step S1611, the mapping data management unit 220 may receive mapping data. In various embodiments, the mapping data management unit 220 may receive extended mapping data from the memory device 100. In an embodiment, the mapping data management unit 220 may receive a plurality of pieces of extended mapping data from the memory device 100.

In an embodiment, the mapping data management unit 220 may receive, from the memory device 100, the extended mapping data corresponding to the mapping data read command MDR_CMD. The mapping data management unit 220 may receive extended mapping data on a map segment basis. When the extended mapping data is received from the memory device 100, the mapping data management unit 220 may receive all of a plurality of pieces of extended mapping data included in one map segment, and thereafter receive a plurality of pieces of extended mapping data included in a subsequent map segment.

At step S1613, the mapping data management unit 220 may output, to the host 300, the extended mapping data received from the memory device 100. The mapping data management unit 220 may receive the extended mapping data corresponding to the mapping data read request MR_REQ received from the host 300. The mapping data management unit 220 may output, to the host 300, the extended mapping data on a map segment basis. In other words, in the same manner as when the extended mapping data is received from the memory device 100, the mapping data management unit 220 may output all of a plurality of pieces of extended mapping data included in one map segment, and thereafter output a plurality of pieces of extended mapping data included in a subsequent map segment to the host 300.

In an embodiment, the host 300 may store, in the host memory 310, the extended mapping data received from the mapping data management unit 220. The extended mapping data may be stored in the host memory 310 on a map segment basis. The host 300 may receive extended mapping data corresponding to a map segment from the mapping data management unit 220, and store the extended mapping data corresponding to the map segment in the host memory 310. The host 300 may store extended mapping data corresponding to one map segment, and thereafter store extended mapping data corresponding to a subsequent map segment.

Figure 17:
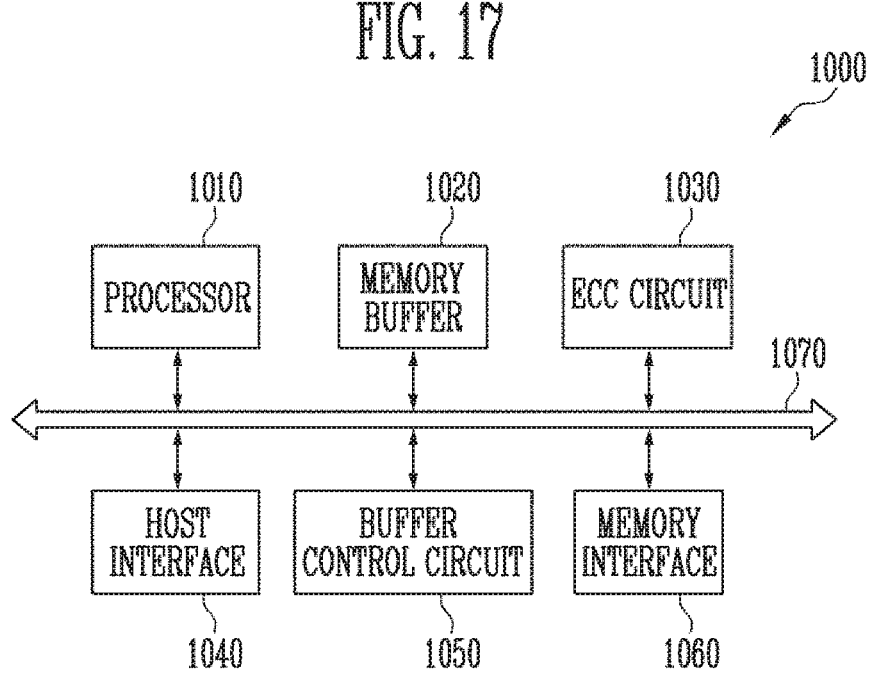
FIG. 17 is a diagram illustrating a memory controller in accordance with an embodiment of the present disclosure.

FIG. 17 is a diagram illustrating a memory controller in accordance with an embodiment of the present disclosure, for example, the memory controller 1000 of FIG. 1.

The memory controller 1000 is coupled to a host (e.g., the host 300 of FIG. 1) and a memory device (e.g., the memory device 100 of FIG. 1). In response to a request from the host 300, the memory controller 1000 may access the memory device 100. For example, the memory controller 1000 may control a write operation, a read operation, an erase operation, and a background operation of the memory device 100. The memory controller 1000 may provide an interface between the memory device 100 and the host 300. The memory controller 1000 may drive firmware for controlling the memory device 100.

Referring to FIG. 17, the memory controller 1000 may include a processor 1010, a memory buffer 1020, an error correction code (ECC) circuit 1030, a host interface 1040, a buffer control circuit 1050, a memory interface 1060, and a bus 1070.

The bus 1070 may provide a channel between the components of the memory controller 1000.

The processor 1010 may control the overall operation of the memory controller 1000 and perform a logical operation. The processor 1010 may communicate with the host 300 through the host interface 1040, and communicate with the memory device 100 through the memory interface 1060. In addition, the processor 1010 may communicate with the memory buffer 1020 through the buffer control circuit 1050. The processor 1010 may control the operation of a storage device by using the memory buffer 1020 as an operating memory, a cache memory, or a buffer memory.

The processor 1010 may perform the function of a flash translation layer (FTL). The processor 1010 may translate a logical block address (LBA), provided by the host 300, into a physical block address (PBA) through the FTL. The FTL may receive the LBA and translate the LBA into the PBA using a mapping table. An address mapping method using the FTL may be modified in various ways depending on the unit of mapping. Representative address mapping methods may include a page mapping method, a block mapping method, and a hybrid mapping method.

The processor 1010 may randomize data received from the host 300. For example, the processor 1010 may use a randomizing seed to randomize data received from the host 300. Randomized data may be provided to the memory device 100 as data to be stored, and may be programmed to the memory cell array.

During a read operation, the processor 1010 may derandomize data received from the memory device 100. For example, the processor 1010 may use a derandomizing seed to derandomize data received from the memory device 100. Derandomized data may be output to the host 300.

In an embodiment, the processor 1010 may drive software or firmware to perform the randomizing operation or the derandomizing operation.

The memory buffer 1020 may be used as an operating memory, a cache memory, or a buffer memory of the processor 1010. The memory buffer 1020 may store codes and commands to be executed by the processor 1010. The memory buffer 1020 may store data to be processed by the processor 1010. The memory buffer 1020 may include a static RAM (SRAM) or a dynamic RAM (DRAM).

The ECC circuit 1030 may perform error correction. The ECC circuit 1030 may perform an ECC encoding operation based on data to be written to the memory device 100 through the memory interface 1060. ECC encoded data may be transmitted to the memory device 100 through the memory interface 1060. The ECC circuit 1030 may perform an ECC decoding operation on data received from the memory device 100 through the memory interface 1060. For example, the ECC circuit 1030 may be included in the memory interface 1060 as a component of the memory interface 1060.

The host interface 1040 may communicate with the host 300 under control of the processor 1010. The host interface 1040 may perform communication using at least one of various communication methods such as a universal serial bus (USB), a serial AT attachment (SATA), a serial attached SCSI (SAS), a high speed interchip (HSIC), a small computer system interface (SCSI), a peripheral component interconnection (PCI), a PCI express (PCIe), a nonvolatile memory express (NVMe), a universal flash storage (UFS), a secure digital (SD), multiMedia card (MMC), an embedded MMC (eMMC), a dual in-line memory module (DIMM), a registered DIMM (RDIMM), and a load reduced DIMM (LRDIMM) communication methods.

The buffer control circuit 1050 may control the memory buffer 1020 under control of the processor 1010.

The memory interface 1060 may communicate with the memory device 100 under control of the processor 1010. The memory interface 1060 may communicate a command, an address, and data with the memory device 100 through the channel.

For example, the memory controller 1000 may include neither the memory buffer 1020 nor the buffer control circuit 1050.

For example, the processor 1010 may use codes to control the operation of the memory controller 1000. The processor 1010 may load codes from a nonvolatile memory device (e.g., a read only memory) provided in the memory controller 1000. Alternatively, the processor 1010 may load codes from the memory device 100 through the memory interface 1060.

For example, the bus 1070 of the memory controller 1000 may be divided into a control bus and a data bus. The data bus may transmit data in the memory controller 1000. The control bus may transmit control information such as a command and an address in the memory controller 1000. The data bus and the control bus may be separated from each other and may neither interfere with each other nor affect each other. The data bus may be coupled to the ECC circuit 1030, the host interface 1040, the buffer control circuit 1050, and the memory interface 1060. The control bus may be coupled to the processor 1010, the memory buffer 1020, the host interface 1040, the buffer control circuit 1050, and the memory interface 1060.

Figure 18:
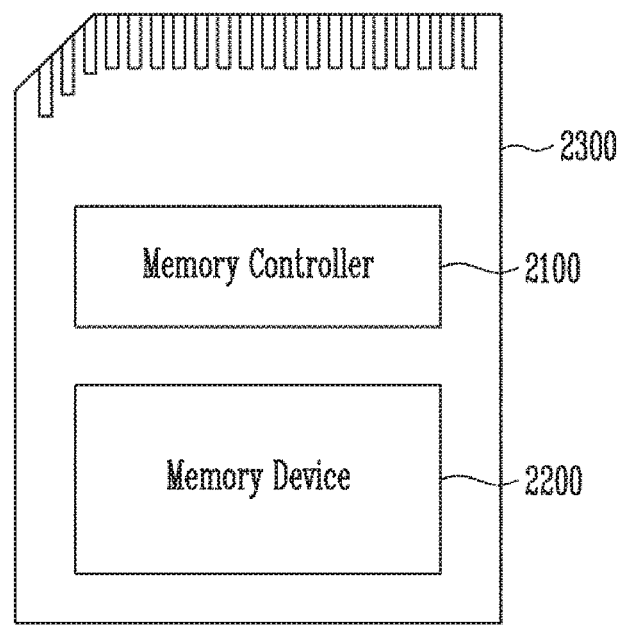
FIG. 18 is a block diagram illustrating a memory card system including a storage device in accordance with an embodiment of the present disclosure.

FIG. 18 is a block diagram illustrating a memory card system 2000 including a storage device in accordance with an embodiment of the present disclosure.

Referring FIG. 18, the memory card system 2000 may include a memory controller 2100, a memory device 2200, and a connector 2300.

The memory controller 2100 is coupled to the memory device 2200. The memory controller 2100 may access the memory device 2200. For example, the memory controller 2100 may control a read operation, a write operation, an erase operation, and a background operation of the memory device 2200. The memory controller 2100 may provide an interface between the memory device 2100 and a host (e.g., the host 300 of FIG. 1). The memory controller 2100 may drive firmware for controlling the memory device 2200. The memory device 2200 may be embodied in the same manner as that of the memory device 100 described with reference to FIG. 10.

In an embodiment, the memory controller 2100 may include components such as a random access memory (RAM), a processing unit, a host interface, and a memory interface, and an ECC circuit.

The memory controller 2100 may communicate with an external device through the connector 2300. The memory controller 2100 may communicate with an external device (e.g., a host) based on a specific communication protocol. In an embodiment, the memory controller 2100 may communicate with the external device through at least one of various communication protocols such as universal serial bus (USB), multimedia card (MMC), embedded MMC (eMMC), peripheral component interconnection (PCI), PCI-express (PCI-e or PCIe), advanced technology attachment (ATA), serial-ATA (SATA), parallel-ATA (PATA), small computer small interface (SCSI), enhanced small disk interface (ESDI), integrated drive electronics (IDE), Firewire, universal flash storage (UFS), Wi-Fi, Bluetooth, and nonvolatile memory express (NVMe) protocols. In an embodiment, the connector 2300 may be defined by at least one of the above-described various communication protocols.

In an embodiment, the memory device 2200 may be implemented as any of various nonvolatile memory devices, such as an electrically erasable and programmable ROM (EEPROM), a NAND flash memory, a NOR flash memory, a phase-change RAM (PRAM), a resistive RAM (ReRAM), a ferroelectric RAM (FRAM), and a spin-torque magnetic RAM (STT-MRAM).

In an embodiment, the memory controller 2100 and the memory device 2200 may be integrated into a single semiconductor device to form a memory card. For example, the memory controller 2100 and the memory device 2200 may be integrated into a single semiconductor device to form a memory card such as a personal computer memory card international association (PCMCIA), a compact flash card (CF), a smart media card (e.g., SM or SMC), a memory stick, a multimedia card (e.g., MMC, RS-MMC, or MMC-micro), a secure digital (SD) card (e.g., SD, miniSD, microSD, or SDHC), or a universal flash storage (UFS).

Figure 19:
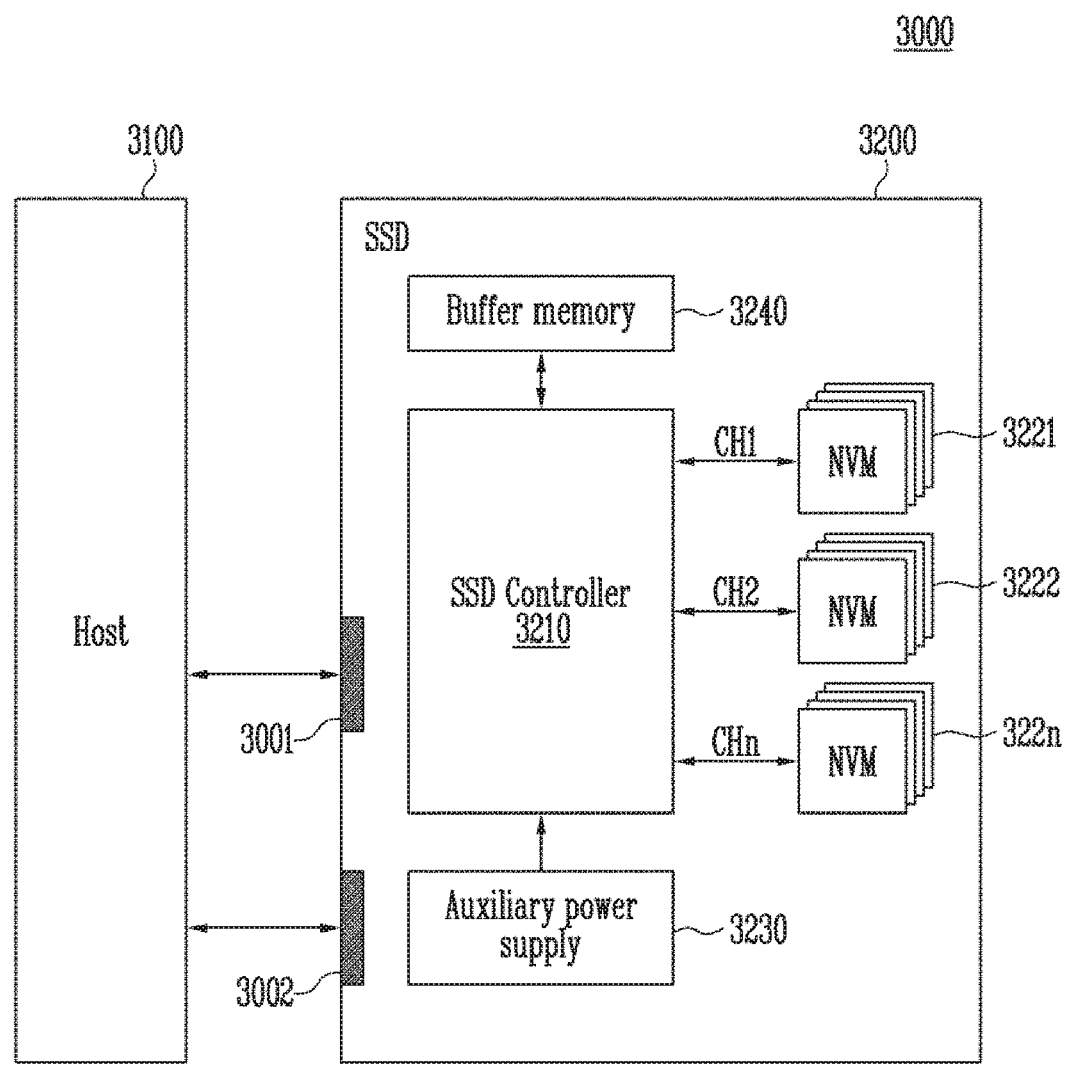
FIG. 19 is a block diagram illustrating a solid state drive (SSD) system including a storage device in accordance with an embodiment of the present disclosure.

FIG. 19 is a block diagram illustrating a solid state drive (SSD) system 3000 including a storage device in accordance with an embodiment of the present disclosure.

Referring to FIG. 19, the SSD system 3000 may include a host 3100 and an SSD 3200. The SSD 3200 may exchange signals SIG with the host 3100 through a signal connector 3001 and may receive power PWR through a power connector 3002. The SSD 3200 may include an SSD controller 3210, a plurality of flash memories 3221 to 322n, an auxiliary power supply 3230, and a buffer memory 3240.

In an embodiment, the SSD controller 3210 may perform the function of the memory controller 200 described above with reference to FIG. 1.

The SSD controller 3210 may control the plurality of flash memories 3221 to 322n in response to the signals SIG received from the host 3100. In an embodiment, the signals SIG may be signals based on an interface between the host 3100 and the SSD 3200. For example, the signals SIG may be signals defined by at least one of various interfaces such as universal serial bus (USB), multimedia card (MMC), embedded MMC (eMMC), peripheral component interconnection (PCI), PCI-express (PCI-e or PCIe), advanced technology attachment (ATA), serial-ATA (SATA), parallel-ATA (PATA), small computer small interface (SCSI), enhanced small disk interface (ESDI), integrated drive electronics (IDE), Firewire, universal flash storage (UFS), Wi-Fi, Bluetooth, and nonvolatile memory express (NVMe) interfaces.

The auxiliary power supply 3230 may be coupled to the host 3100 through the power connector 3002. The auxiliary power supply 3230 may be supplied with power PWR from the host 3100, and may be charged by the power PWR. The auxiliary power supply 3230 may supply the power of the SSD 3200 when the supply of power from the host 3100 is not smoothly performed. In an embodiment, the auxiliary power supply 3230 may be positioned inside the SSD 3200 or positioned outside the SSD 3200. For example, the auxiliary power supply 3230 may be disposed in a main board and may supply auxiliary power to the SSD 3200.

The buffer memory 3240 functions as a buffer memory of the SSD 3200. For example, the buffer memory 3240 may temporarily store data received from the host 3100 or data received from the plurality of flash memories 3221 to 322n or may temporarily store metadata (e.g., a mapping table) of the flash memories 3221 to 322n. The buffer memory 3240 may include volatile memories such as DRAM, SDRAM, DDR SDRAM, LPDDR SDRAM, and GRAM or nonvolatile memories such as FRAM, ReRAM, SII-MRAM, and PRAM.

Figure 20:
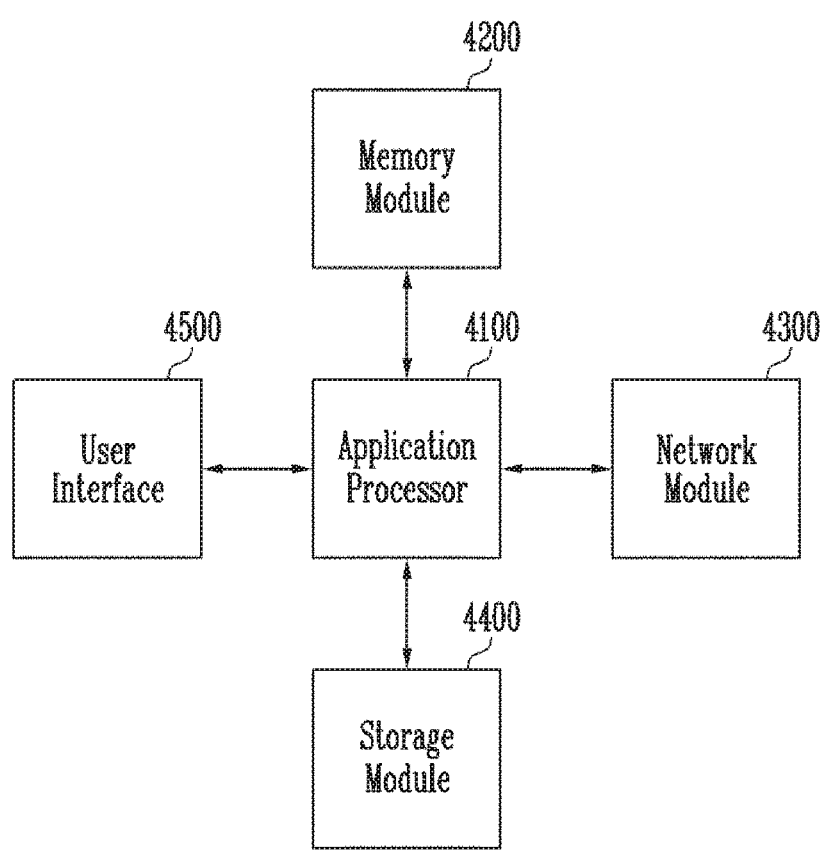
FIG. 20 is a block diagram illustrating a user system including a storage device in accordance with an embodiment of the present disclosure.

FIG. 20 is a block diagram illustrating a user system 4000 including a storage device in accordance with an embodiment of the present disclosure.

Referring to FIG. 20, the user system 4000 may include an application processor 4100, a memory module 4200, a network module 4300, a storage module 4400, and a user interface 4500.

The application processor 4100 may run components included in the user system 4000, an operating system (OS) or a user program. In an embodiment, the application processor 4100 may include controllers, interfaces, graphic engines, etc. for controlling the components included in the user system 4000. The application processor 4100 may be provided as a system-on-chip (SoC).

The memory module 4200 may function as a main memory, a working memory, a buffer memory, or a cache memory of the user system 4000. The memory module 4200 may include a volatile RAM such as a DRAM, an SDRAM, a DDR SDRAM, a DDR2 SDRAM, a DDR3 SDRAM, an LPDDR SDARM, and an LPDDR3 SDRAM, or a nonvolatile RAM such as a PRAM, a ReRAM, an MRAM, and an FRAM. In an embodiment, the application processor 4100 and the memory module 4200 may be packaged based on package-on-package (POP) and may then be provided as a single semiconductor package.

The network module 4300 may communicate with external devices. For example, the network module 4300 may support wireless communication, such as code division multiple access (CDMA), global system for mobile communication (GSM), wideband CDMA (WCDMA), CDMA-2000, time division multiple access (TDMA), long term evolution (LTE), WiMAX, WLAN, UWB, Bluetooth, or Wi-Fi communication. In an embodiment, the network module 4300 may be included in the application processor 4100.

The storage module 4400 may store data therein. For example, the storage module 4400 may store data received from the application processor 4100. Alternatively, the storage module 4400 may transmit the data stored in the storage module 4400 to the application processor 4100. In an embodiment, the storage module 4400 may be implemented as a nonvolatile semiconductor memory device, such as a phase-change RAM (PRAM), a magnetic RAM (MRAM), a resistive RAM (RRAM), a NAND flash memory, a NOR flash memory, or a NAND flash memory having a three-dimensional (3D) structure. In an embodiment, the storage module 4400 may be provided as a removable storage medium (i.e., removable drive), such as a memory card or an external drive of the user system 4000.

In an embodiment, the storage module 4400 may include a plurality of nonvolatile memory devices, and each of the plurality of nonvolatile memory devices may be operated in the same manner as that of the memory device 100 described above with reference to FIGS. 10 to 13. The storage module 4400 may be operated in the same manner as that of the storage device 50 described above with reference to FIG. 1.

The user interface 4500 may include interfaces for inputting data or instructions to the application processor 4100 or outputting data to an external device. In an embodiment, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric device. The user interface 4500 may further include user output interfaces such as an a liquid crystal display (LCD), an organic light emitting diode (OLED) display device, an active matrix OLED (AMOLED) display device, an LED, a speaker, and a motor.

Various embodiments of the present disclosure may provide a memory controller capable of efficiently generating mapping data, and a method of operating the memory controller.

Although the embodiments of the present disclosure have been disclosed, those skilled in the art will appreciate that various modifications, additions and substitutions are possible, without departing from the scope and spirit of the present disclosure.

Therefore, the scope of the present disclosure must be defined by the appended claims and equivalents of the claims rather than by the description preceding them.

In the above-discussed embodiments, all steps may be selectively performed or skipped. In addition, the steps in each embodiment may not be always performed in regular order. Furthermore, the embodiments disclosed in the present specification and the drawings aim to help those with ordinary knowledge in this art more clearly understand the present disclosure rather than aiming to limit the bounds of the present disclosure. One of ordinary skill in the art to which the present disclosure belongs will be able to easily understand that various modifications are possible based on the technical scope of the present disclosure.

Embodiments of the present disclosure have been described with reference to the accompanying drawings, and specific terms or words used in the description should be construed in accordance with the spirit of the present disclosure without limiting the subject matter thereof. It should be understood that many variations and modifications of the basic inventive concept described herein will still fall within the spirit and scope of the present disclosure as defined in the appended claims and their equivalents.

What is claimed is:

1. A memory controller comprising:
    a mapping data determination unit configured to receive, from a memory device, bitmap information indicating whether a map segment, corresponding a bit included in the bitmap information and including a plurality of pieces of extended mapping data, has been stored in the memory device, and generate information indicating whether to generate the plurality of pieces of extended mapping data based on the bitmap information received from the memory device; and
    a mapping data management unit configured to output information indicating whether the plurality of pieces of extended mapping data have been generated based on the bitmap information,
    wherein each of the plurality of pieces of extended mapping data includes mapping information between a logical block address and a physical block address, and
    wherein if the plurality of pieces of extended mapping data have been all generated, the mapping data management unit outputs the plurality of pieces of extended mapping data, and if the plurality of pieces of extended mapping data have not been all generated, the mapping data management unit generates the plurality of pieces of extended mapping data, based on the bitmap information.

2. The memory controller according to claim 1, wherein each of the plurality of pieces of extended mapping data includes a logical block address of a hot data area, which is determined depending on a frequency of access of a host to the logical block address.

3. The memory controller according to claim 1, wherein each of the plurality of pieces of extended mapping data further includes additional field information, which includes information about a number of times the mapping relationship between the logical block address and the physical block address has been updated.

4. The memory controller according to claim 1, wherein each of the plurality of pieces of extended mapping data further includes additional field information, which includes information for error correction.

5. The memory controller according to claim 1, wherein the mapping data management unit outputs, to the memory device, a command for generating a bitmap of a map segment corresponding to the plurality of pieces of extended mapping data.

6. The memory controller according to claim 1, wherein, when the memory device is in a power sleep mode during the generation of the plurality of pieces of extended mapping data, the mapping data management unit generates the plurality of pieces of extended mapping data based on the bitmap information after the power sleep mode ends.

7. The memory controller according to claim 1, wherein, when all of the plurality of pieces of extended mapping data corresponding to the map segment are generated, the mapping data management unit outputs, to the memory device, a command for storing the plurality of pieces of extended mapping data corresponding to the map segment.

8. The memory controller according to claim 7, wherein, when all of the plurality of pieces of extended mapping data corresponding to the map segment are generated, the mapping data management unit outputs, to the memory device, a response indicating that the plurality of pieces of extended mapping data corresponding to the map segment have been generated.

9. The memory controller according to claim 1, wherein, when all of the plurality of pieces of extended mapping data corresponding to the map segment are generated, the mapping data management unit outputs, to the memory device, a command for updating a bitmap corresponding to the map segment.

10. The memory controller according to claim 1, wherein the mapping data management unit outputs, to the memory device, a command for outputting the plurality of pieces of extended mapping data to a host based on the bitmap information.

11. The memory controller according to claim 1, wherein, when the plurality of pieces of extended mapping data are not stored in the memory device, the mapping data management unit outputs a generation incompletion response indicating that the plurality of pieces of extended mapping data are not stored in the memory device.

12. A method of operating a memory controller, the method comprising:
- receiving, from a host, a request for outputting extended mapping data to the host;
- receiving, from a memory device, bitmap information of a map segment corresponding to a plurality of pieces of extended mapping data in response to the request;
- determining whether the plurality of pieces of extended mapping data have been stored in the memory device and whether to output the plurality of pieces of extended mapping data based on the bitmap information; and
- outputting a generation incompletion response to the host when the plurality of pieces of extended mapping data are not present,
- wherein each of the plurality of pieces of extended mapping data includes mapping information between a logical block address and a physical block address.

13. The method according to claim 12, wherein the determining whether to output the plurality of pieces of extended mapping data comprises determining whether to output a plurality of pieces of extended mapping data corresponding to the map segment.

\* \* \* \* \*